(12) United States Patent
Hsu et al.

(10) Patent No.: US 11,334,122 B2
(45) Date of Patent: May 17, 2022

(54) HINGE MECHANISM FOR A FLEXIBLE ELECTRONIC DEVICE

(71) Applicant: FOSITEK CORPORATION, New Taipei (TW)

(72) Inventors: An-Szu Hsu, New Taipei (TW); Yan-Jiao Cheng, Shenzhen (CN); Shao-Chun Chao, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 512 days.

(21) Appl. No.: 16/553,723

(22) Filed: Aug. 28, 2019

(65) Prior Publication Data
US 2020/0401193 A1 Dec. 24, 2020

(30) Foreign Application Priority Data

Jun. 24, 2019 (CN) .......................... 201910550385.1
Jun. 24, 2019 (CN) .......................... 201920969720.7

(51) Int. Cl.
| | |
|---|---|
| *G06F 1/16* | (2006.01) |
| *F16M 11/22* | (2006.01) |
| *F16C 11/04* | (2006.01) |
| *E05D 11/00* | (2006.01) |
| *E05D 11/08* | (2006.01) |
| *E05D 3/12* | (2006.01) |

(52) U.S. Cl.
CPC ........... *G06F 1/1681* (2013.01); *E05D 3/122* (2013.01); *E05D 11/0054* (2013.01); *E05D 11/082* (2013.01); *F16C 11/04* (2013.01); *F16M 11/22* (2013.01); *G06F 1/1652* (2013.01); *E05Y 2201/11* (2013.01); *E05Y 2900/606* (2013.01)

(58) Field of Classification Search
CPC .......................... G06F 1/1681; E05D 11/0054
See application file for complete search history.

(56) References Cited

U.S. PATENT DOCUMENTS

| | | | | |
|---|---|---|---|---|
| 4,736,491 | A * | 4/1988 | Mertes ...................... | E05D 3/18 16/370 |
| 6,659,559 | B1 * | 12/2003 | Metzler .................... | B60N 2/43 297/378.12 |
| 9,759,242 | B2 * | 9/2017 | Hsu .......................... | G06F 1/16 |
| 9,864,415 | B2 * | 1/2018 | Siddiqui ............... | E05D 11/082 |
| 10,143,098 | B1 * | 11/2018 | Lee ....................... | G06F 1/1618 |
| 10,664,021 | B1 * | 5/2020 | Hsu ....................... | G06F 1/1681 |
| 10,983,569 | B2 * | 4/2021 | Lin ......................... | G06F 1/1616 |
| 11,016,541 | B2 * | 5/2021 | Lin ......................... | E05D 3/122 |
| 2017/0208703 | A1 * | 7/2017 | Lin ......................... | H05K 7/16 |
| 2017/0269637 | A1 * | 9/2017 | Lin ......................... | F16C 11/04 |
| 2020/0383217 | A1 * | 12/2020 | Kim ....................... | E05D 3/06 |
| 2020/0383219 | A1 * | 12/2020 | Hale ...................... | G06F 1/1641 |

(Continued)

*Primary Examiner* — Jason W San
(74) *Attorney, Agent, or Firm* — Birch, Stewart, Kolasch & Birch, LLP

(57) ABSTRACT

A hinge mechanism includes first and second inner guiding members secured on a base seat, and first and second movable members slidable engaged with the first and second inner guiding members and connected with first and second substrate units. During the movement of the movable members to an upright folded state, inboard end edges of the substrate units are moved away from each other to provide a bending space therebetween for a flexible display attached to the substrate units to be bendably received therein.

10 Claims, 25 Drawing Sheets

(56) References Cited

U.S. PATENT DOCUMENTS

| | | | | |
|---|---|---|---|---|
| 2020/0409427 A1* | 12/2020 | Hsu | .................... | G06F 1/1641 |
| 2020/0409429 A1* | 12/2020 | Hsu | .................... | G06F 1/1616 |
| 2021/0173449 A1* | 6/2021 | Yao | .................... | G06F 1/1652 |
| 2021/0195775 A1* | 6/2021 | Zhao | .................... | H04M 1/022 |
| 2021/0200277 A1* | 7/2021 | Park | .................... | G06F 1/1618 |
| 2021/0223827 A1* | 7/2021 | Moon | .................... | G06F 3/0488 |

* cited by examiner

HINGE MECHANISM FOR A FLEXIBLE ELECTRONIC DEVICE

CROSS-REFERENCE TO RELATED APPLICATION

This application claims priority of Chinese Patent Application No. 201910550385.1, filed on Jun. 24, 2019, and Chinese Patent Application No. 201920969720.7, filed on Jun. 24, 2019.

FIELD

The disclosure relates to a hinge mechanism, and more particularly to a hinge mechanism for a flexible electronic device having a flexible display.

BACKGROUND

A conventional consumer electronic device with flexible display technology generally has two substrates for mounting a flexible display thereon, and at least one hinge mechanism disposed between the substrates to permit shifting of the substrates between a parallel unfolded state and an upright folded state so as to fold and unfold the flexible display. When the flexible display is folded, an additional receiving space within the hinge mechanism is required for receiving a bending portion of the flexible display to prevent damage to the flexible display.

SUMMARY

Therefore, an object of the disclosure is to provide a hinge mechanism that can alleviate at least one of the drawbacks of the prior art.

According to the disclosure, the hinge mechanism is mountable on a support mechanism for carrying a flexible display. The support mechanism includes a base seat, and first and second substrate units which respectively have first and second inboard end edges that are respectively disposed at two sides of the base seat opposite in a lengthwise direction, and first and second attaching surfaces that extend respectively from the first and second inboard end edges in the lengthwise direction for first and second face parts of the flexible display to be attached thereto. The hinge mechanism includes at least one first inner guiding member, a first movable member, at least one second inner guiding member and a second movable member. The first inner guiding member is disposed in the base seat and is erected in a height direction that is transverse to the lengthwise direction. The first inner guiding member has a first inner sliding slot which is elongated in the lengthwise direction. The first movable member is adjoined to the first inner guiding member in a width direction that is transverse to the lengthwise direction, and has a first moving end portion which is slidably engaged in the first inner sliding slot, and a first connecting end portion which is opposite to the first moving end portion in the lengthwise direction and which is connected with the first inboard end edge of the first substrate unit such that the first connecting end portion is movable upwardly to be placed upwardly of the first moving end portion and to bring the first substrate unit and the first face part in an upright state. The second inner guiding member is disposed in the base seat, and has a second inner sliding slot elongated in the lengthwise direction. The second movable member is adjoined to the second inner guiding member in the width direction, and has a second moving end portion which is slidably engaged in the second inner sliding slot, and a second connecting end portion which is opposite to the second moving end portion in the lengthwise direction and which is connected with the second inboard end edge of the second substrate unit such that the second connecting end portion is movable upwardly to be placed upwardly of the second moving end portion and to bring the second substrate unit and the second face part in an upright state. During the upward movement of the first connecting end portion, the first moving end portion is slided along the first inner sliding slot away from the second substrate unit, and the first inboard end edge is moved away from the second substrate unit. During the upward movement of the second connecting end portion, the second moving end portion is slided along the second inner sliding slot away from the first substrate unit, and the second inboard end edge is moved away from the first substrate unit so as to provide a leeway space between the first and second inboard end edges for the flexible display to be bendably received therein.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
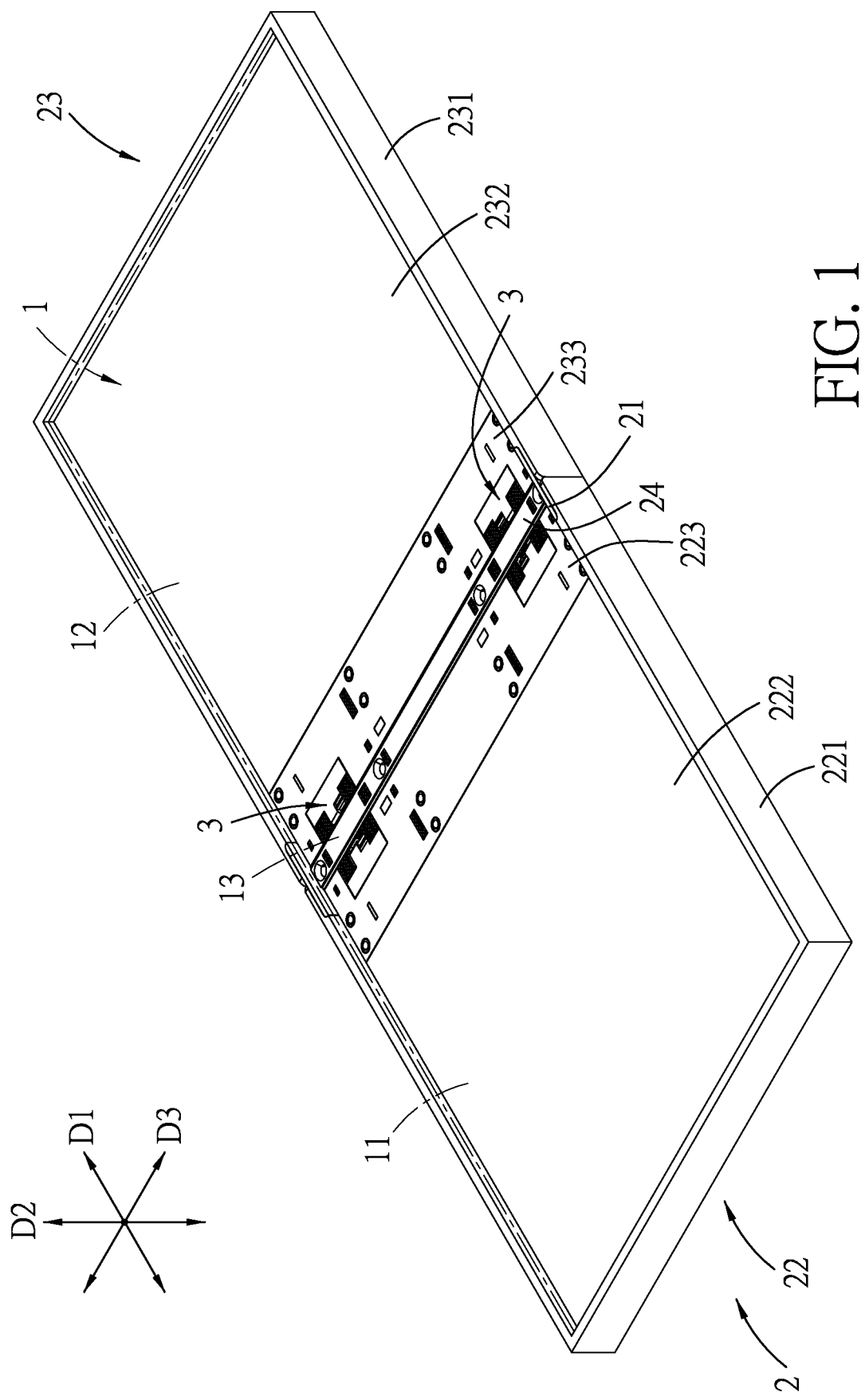
FIG. 1 is a perspective view illustrating an embodiment of a flexible electronic device according to the disclosure in a parallel unfolded state.
Figure 2:
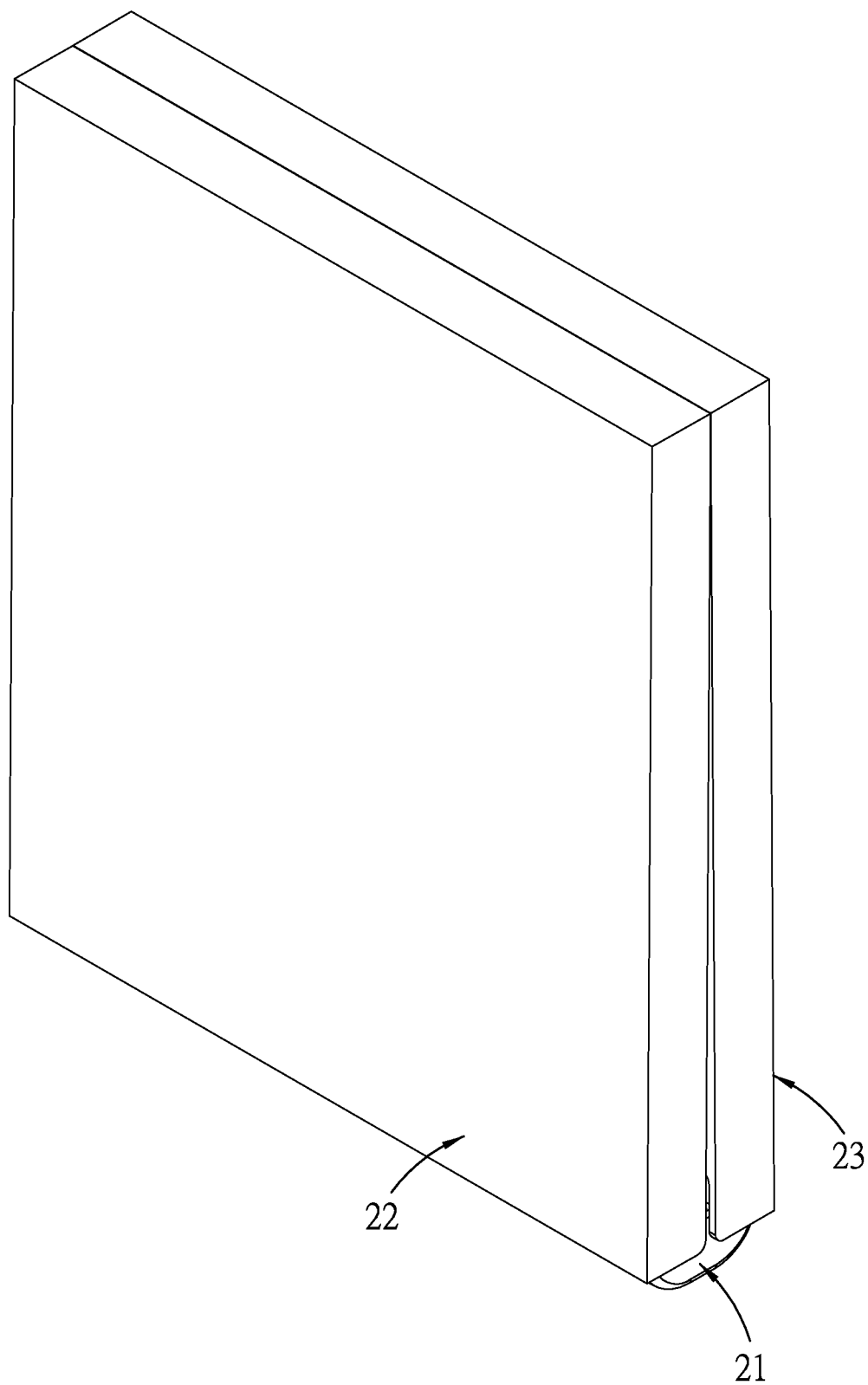
FIG. 2 is a perspective view of the embodiment in an upright folded state.

Referring to FIGS. 1 and 2, an embodiment of a flexible electronic device according to the disclosure includes a flexible display 1, a support mechanism 2 and two hinge mechanisms 3. In this embodiment, the flexible electronic device is a tablet PC having the flexible display 1 carried by and attached to an upper surface of the support mechanism 2. The support mechanism 2 is provided for the hinge mechanisms 3, circuit boards, and associated electronic elements to be mounted thereon. The hinge mechanisms 3 are disposed at two opposite sides of the support mechanism 2 to permit the flexible electronic device to be angularly positioned and to be operable at a desired state, which ranges between a parallel unfolded state (as shown in FIG. 1) and an upright folded state (as shown in FIG. 2). In the upright folded state, the hinge mechanisms 3 provide a bending space for receiving a bending portion of the flexible display 1 to prevent damage to the flexible display 1. In other embodiments, the flexible electronic device may be a mobile phone, a portable PC, and so forth which have the flexible display 1.

To aid in describing the disclosure, directional terms may be used in the specification and claims to describe portions of the present disclosure (e.g., lengthwise, height, width, upper, lower, top, bottom, etc.). These directional definitions are intended to merely assist in describing and claiming the disclosure and are not intended to limit the disclosure in any way.

Figure 3:
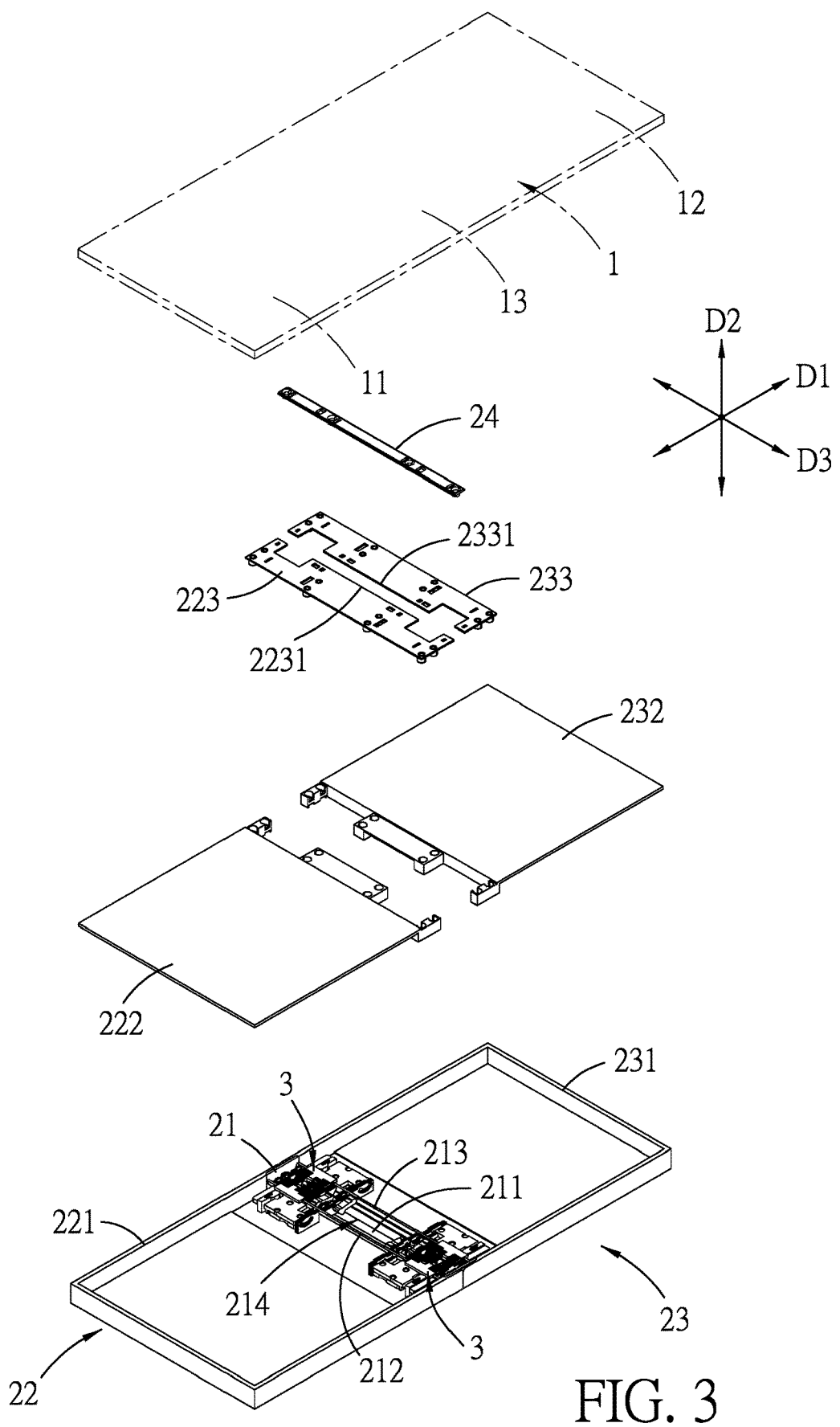
FIG. 3 is an exploded perspective view of the embodiment.

With reference to FIGS. 1 to 3, the support mechanism 2 includes a base seat 21, a first substrate unit 22, a second substrate unit 23 and a top support plate 24. In this embodiment, the base seat 21 has a bottom wall 211 elongated in a width direction (D3), and first and second arcuate extension walls 212, 213 extending from two sides of the bottom wall 211 and opposite to each other in a lengthwise direction (D1) that is transverse to the width direction (D3) to cooperate with the bottom wall 211 for defining an accommodation space 214. The first and second substrate units 22, 23 are disposed at the first and second arcuate extension walls 212, 213, respectively, to extend outwardly and in the lengthwise direction (D1), and are spaced apart from each other. The first substrate unit 22 has a first housing 221, a first outer support plate 222 and a first inner support plate 223. The first outer and inner support plates 222, 223 are disposed upon the first housing 221 and coplanar with each other to define a first attaching surface for a first face part 11 of the flexible display 1 to be attached thereto. Specifically, the first inner support plate 223 is disposed over the first arcuate extension wall 212, and has a first inboard end edge 2231 at the accommodation space 214. The second substrate unit 23 has a second housing 231, a second outer support plate 232 and a second inner support plate 233. The second outer and inner support plates 232, 233 are disposed upon the second housing 231 and coplanar with each other to define a second attaching surface for a second face part 12 of the flexible display 1 to be attached thereto. Specifically, the second inner support plate 233 is disposed over the second arcuate extension wall 213, and has a second inboard end edge 2331 at the accommodation space 214. The top support plate 24 is disposed above the base seat 21 and has two sides disposed adjacent to the first and second inboard end edges 2231, 2331 to be coplanar with the first and second inner support plates 223, 233 for supporting a bending part 13 of the flexible display 1.

In the parallel unfolded state of the electronic device, the first and second housings 221, 231 abut against each other at two adjacent sides so as to conceal two terminal ends of the base seat 21 in the width direction (D3). When the electronic device is in the upright folded state, the first and second housings 221, 231 are close to each other and the base seat 21 is exposed to protect and conceal the hinge mechanisms 3 disposed therein.

Figure 4:
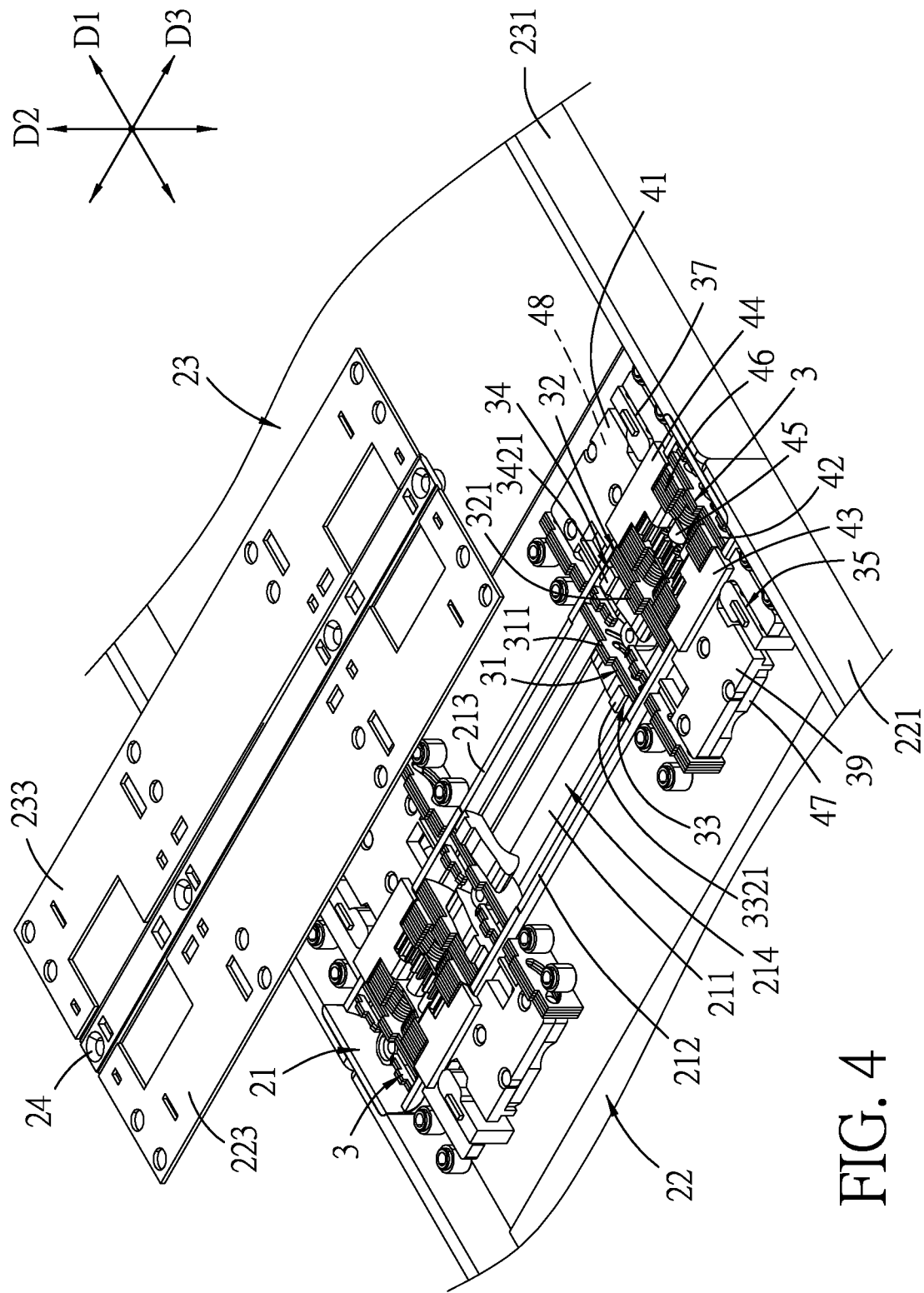
FIG. 4 is a fragmentary exploded perspective view of a portion of the embodiment.
Figure 5:
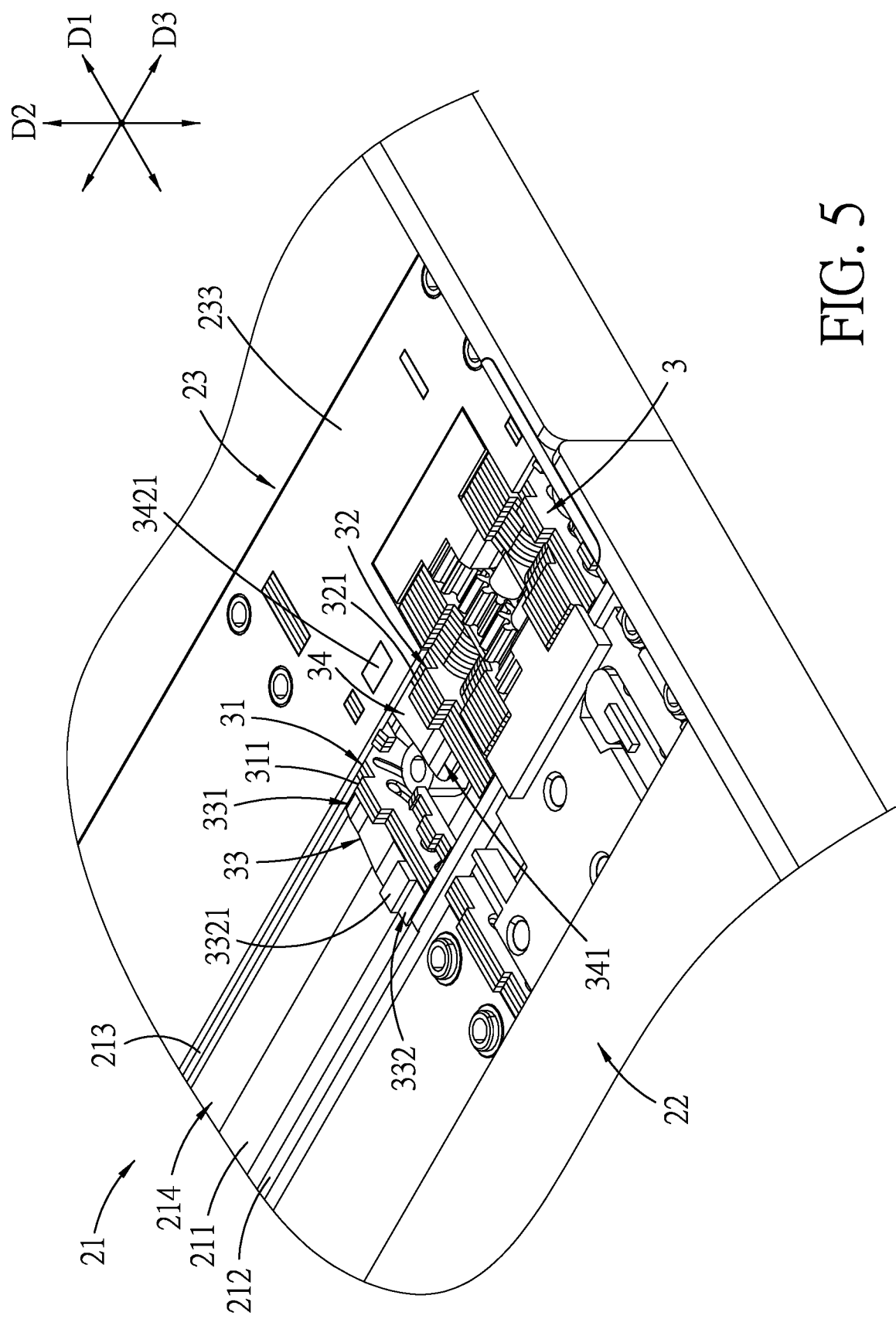
FIG. 5 is a fragmentary perspective view of a portion of the embodiment.
Figure 6:
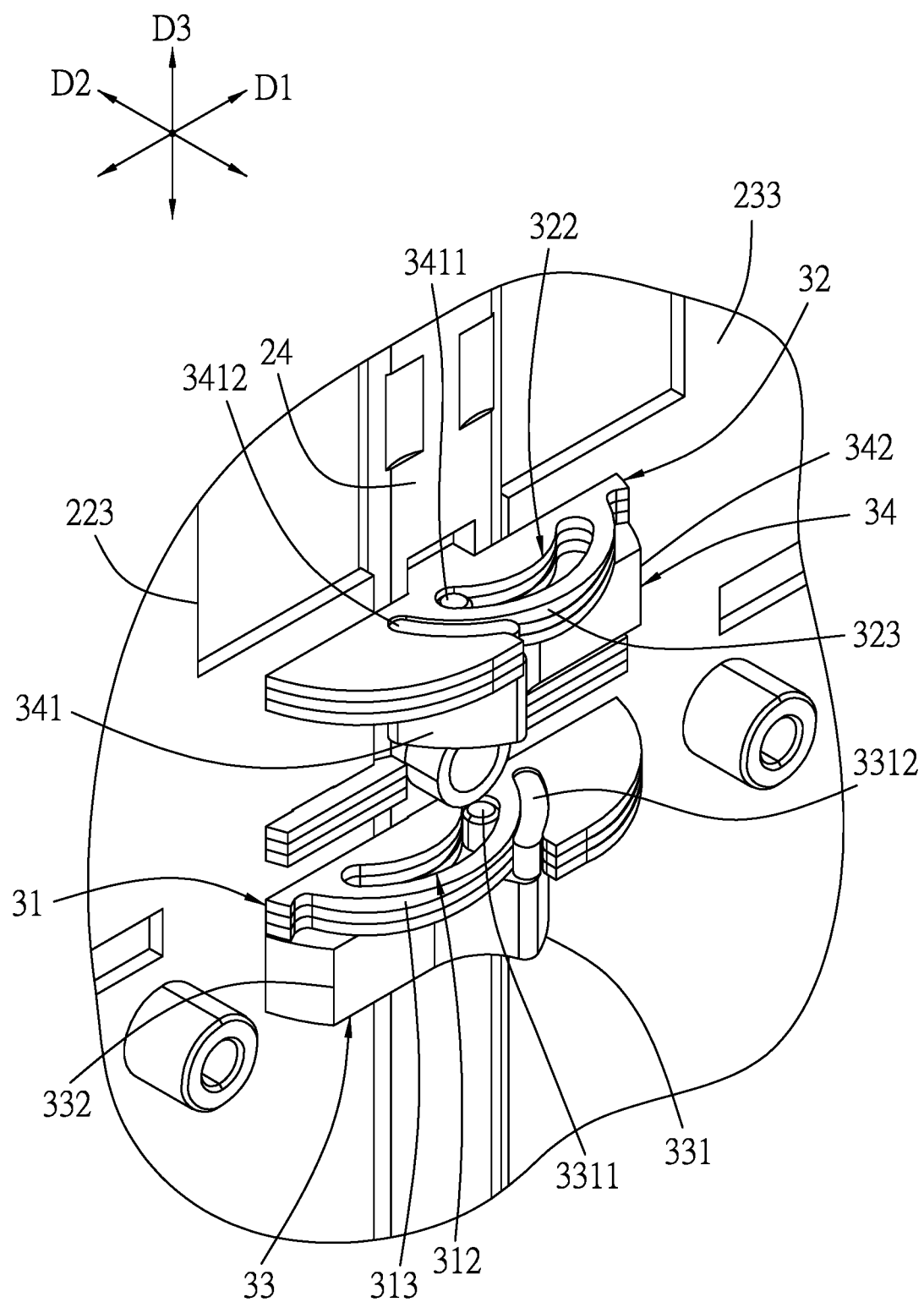
FIG. 6 is a fragmentary perspective view of a portion of the embodiment.

Referring to FIGS. 3 and 4, the hinge mechanisms 3 are disposed between the first and second substrate units 22, 23 and connected with two adjacent sides of the first and second substrate units 22, 23. In this embodiment, the hinge mechanisms 3 are disposed symmetrically. Each hinge mechanism 3 includes at least one first inner guiding member 31, at least one second inner guiding member 32, a first movable member 33, a second movable member 34, a first outer guiding assembly 35, a second outer guiding assembly 37, a first outer connecting member 39, a second outer connecting member 41, two support members 42, a first linking unit 43, a second linking unit 44, a synchronously driving unit 45, a friction increasing unit 46, a first movement stabilizing unit 47 and a second movement stabilizing unit 48.

Referring to FIGS. 4 to 7, in this embodiment, each hinge mechanism 3 includes a plurality of the first inner guiding members 31 and a plurality of second inner guiding members 32. The first inner guiding members 31 are disposed in the accommodation space 214, and are erected in a height direction (D2) that is transverse to the lengthwise direction (D1). Each first inner guiding member 31 has an upper positioning portion 311 which extends in the top support plate 24 to releasably retain the first inner guiding member 31 in the accommodation space 214 such that the first inner guiding member 31 can be detached for replacement. Each first inner guiding member 31 has a first inner sliding slot 312 which is elongated in the lengthwise direction (D1). Specifically, the first inner sliding slot 312 is curved downwardly toward the bottom wall 211 of the base seat 21 and is formed proximate to the first substrate unit 22 so as to extend over the top support plate 24 and the first inner support plate 223. The first inner sliding slot 312 extends to terminate at first slot ends 3121, 3122 respectively proximate to the top support plate 24 and the first inner support plate 223. Each first inner guiding member 31 also has a first rail wall 313 which borders a bottom thereof and which extends parallel to the first inner sliding slot 312. The first inner guiding members 31 respectively have major walls attached and adjoined to each other in the width direction (D3) to have the first inner sliding slots 312 thereof aligned with each other.

Similarly, referring to FIGS. 4 to 7, the second inner guiding members 32 are disposed in the accommodation space 214, and are erected in the height direction (D2). Each second inner guiding member 32 has an upper positioning portion 321 which extends in the top support plate 24 to releasably retain the second inner guiding member 32 in the accommodation space 214. Each second inner guiding member 32 has a second inner sliding slot 322 which is elongated in the lengthwise direction (D1). Specifically, the second inner sliding slot 322 is curved downwardly toward the bottom wall 211 of the base seat 21 and is formed proximate to the second substrate unit 23 so as to extend over the top support plate 24 and the second inner support plate 233. The second inner sliding slot 322 extends to terminate at second slot ends 3221, 3222 respectively proximate to the top support plate 24 and the second inner support plate 233. Each second inner guiding member 32 also has a second rail wall 323 which borders a bottom thereof and which extends parallel to the second inner sliding slot 322. The second inner guiding members 32 respectively have major walls attached and adjoined to each other in the width direction (D3) to have the second inner sliding slots 322 thereof aligned with each other.

Figure 14:
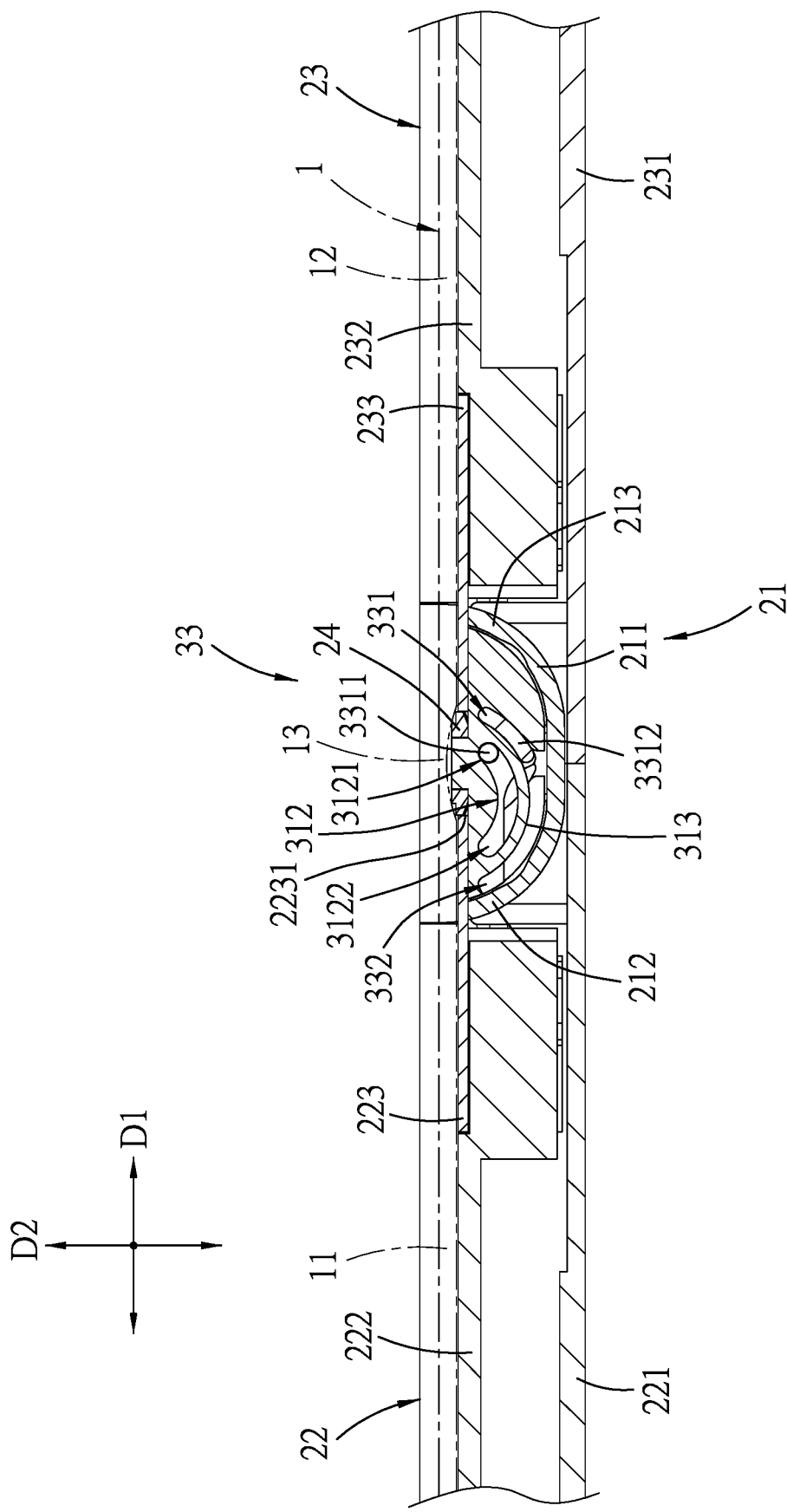
FIG. 14 is a sectional view taken along line XIV-XIV of FIG. 12.
Figure 15:
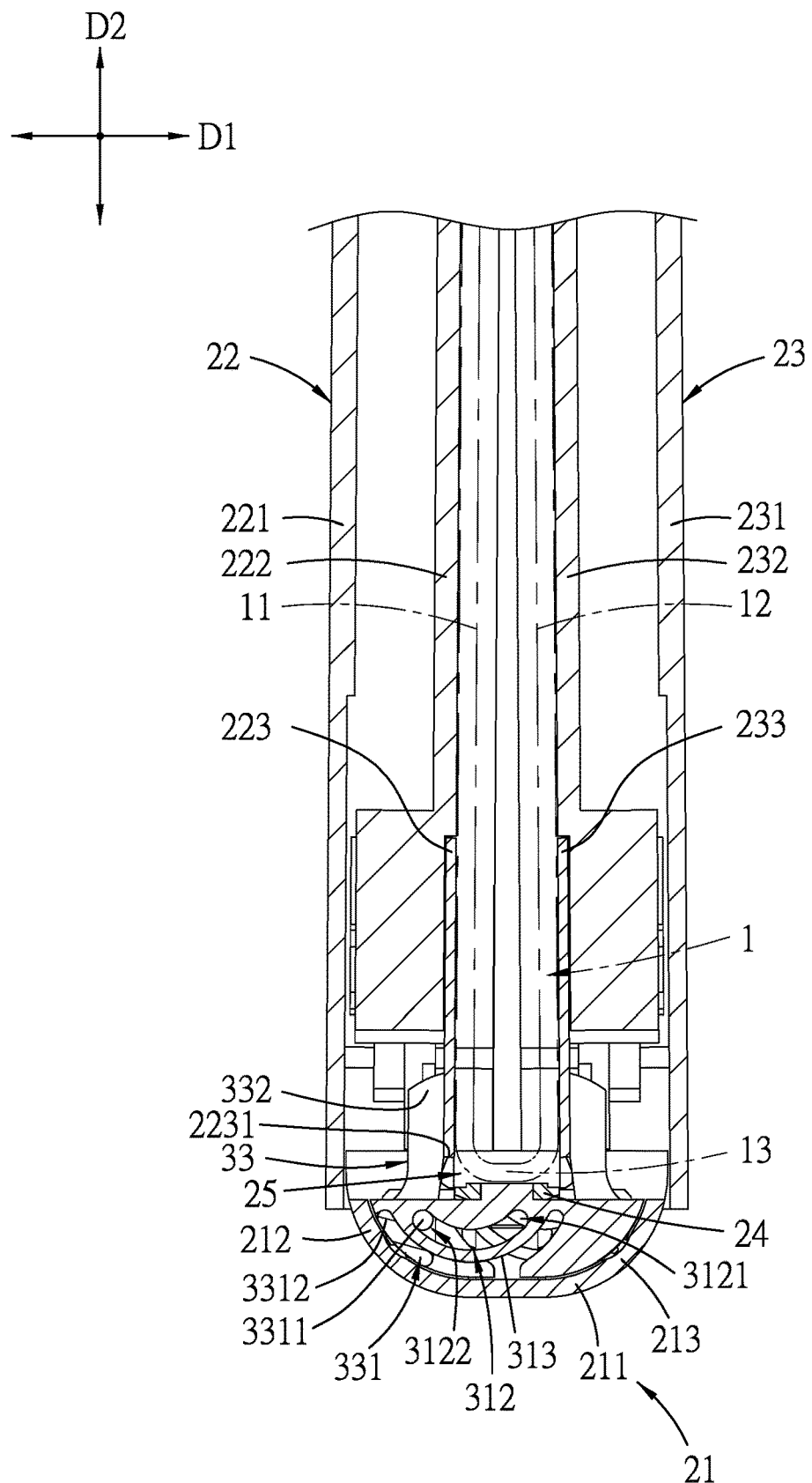
FIG. 15 is a sectional view taken along line XV-XV of FIG. 13.

Referring again to FIGS. 4 to 7, the first movable member 33 is adjoined to the first inner guiding members 31 in the width direction (D3), and has a first moving end portion 331 which is slidably engaged in the first inner sliding slots 312, and a first connecting end portion 332 which is opposite to the first moving end portion 331 in the lengthwise direction (D1) and which is connected with the first inboard end edge 2231 of the first substrate unit 22. Specifically, the first moving end portion 331 of the first movable member 33 has a first sliding pin 3311 which extends in the width direction (D3) and which is slidably engaged in the first inner sliding slots 312, and a first sliding block 3312 which is slidably engaged on the first rail walls 313. In this embodiment, the first movable member 33 is disposed at a side of the first inner guiding members 31 away from the second inner guiding members 32. The first connecting end portion 332 is disposed close to the first arcuate extension wall 212. The first movable member 33 has a top positioning portion 3321 which fittingly extends in the first inner support plate 223 so as to keep the first movable member 33 abutting against the first inner guiding members 31. The first moving end portion 331 is disposed close to the second arcuate extension wall 213. The first sliding pin 3311 is cylindrical to be slidably engaged with slot walls of the first inner sliding slots 312. The first sliding block 3312 is substantially rectangular and slightly arcuate to be slidably engaged on the first rail walls 313. With the engagement of the first sliding pin and block 3311, 3312 with the first sliding slots and rail walls 312, 313, the first movable member 33 is slidable stably and smoothly relative to the first inner guiding members 31 such that the first connecting end portion 332 is movable upwardly to be placed upwardly of the first moving end portion 331 and to bring the first substrate unit 22 and the first face part 11 in an upright state, as shown in FIG. 15. Alternatively, the first sliding block 3312 may be omitted. In the parallel unfolded state, as shown in FIG. 14, the first sliding pin 3311 is placed in the first slot ends 3121.

Figure 17:
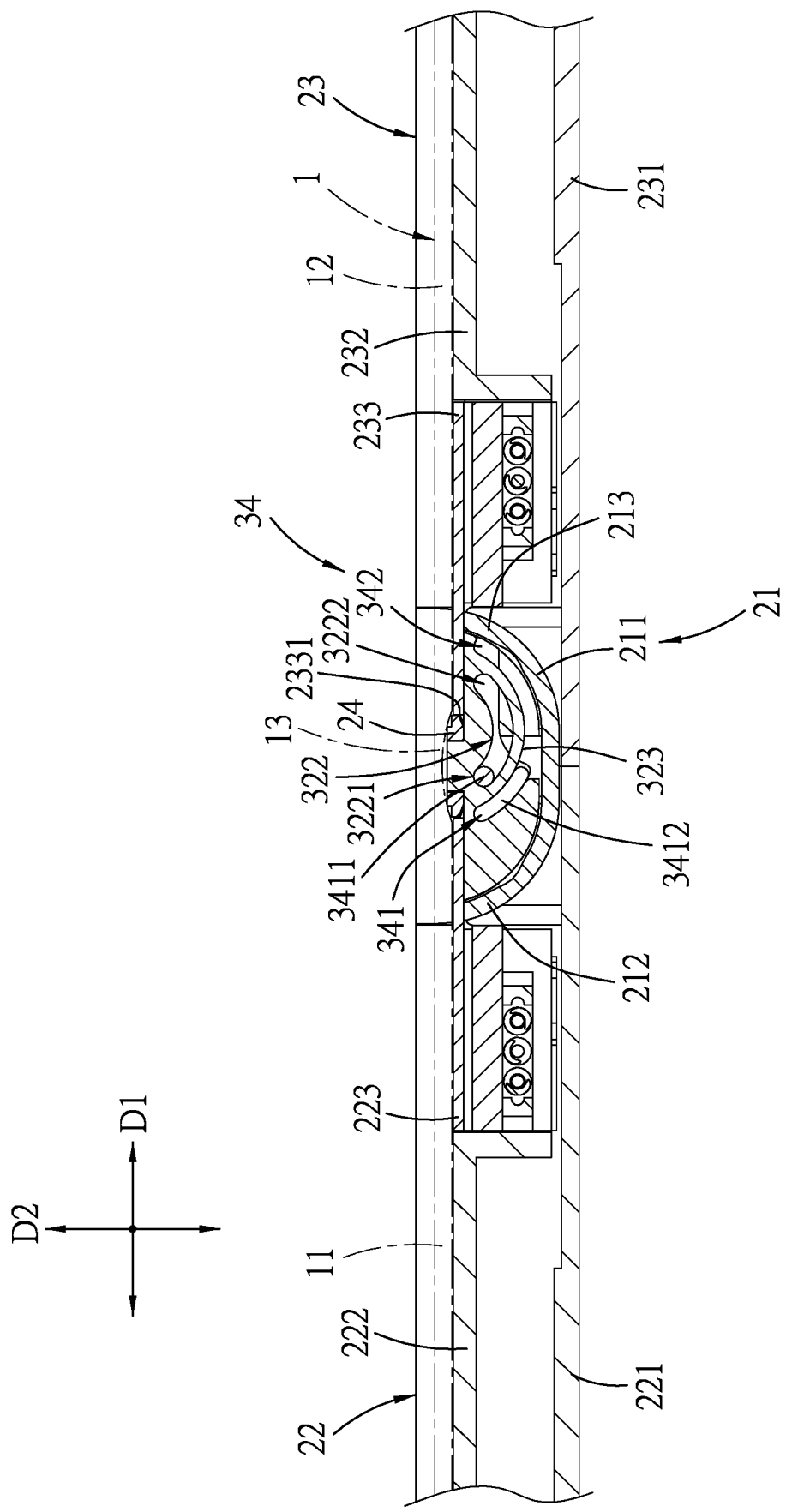
FIG. 17 is a sectional view taken along line XVII-XVII of FIG. 12.
Figure 18:
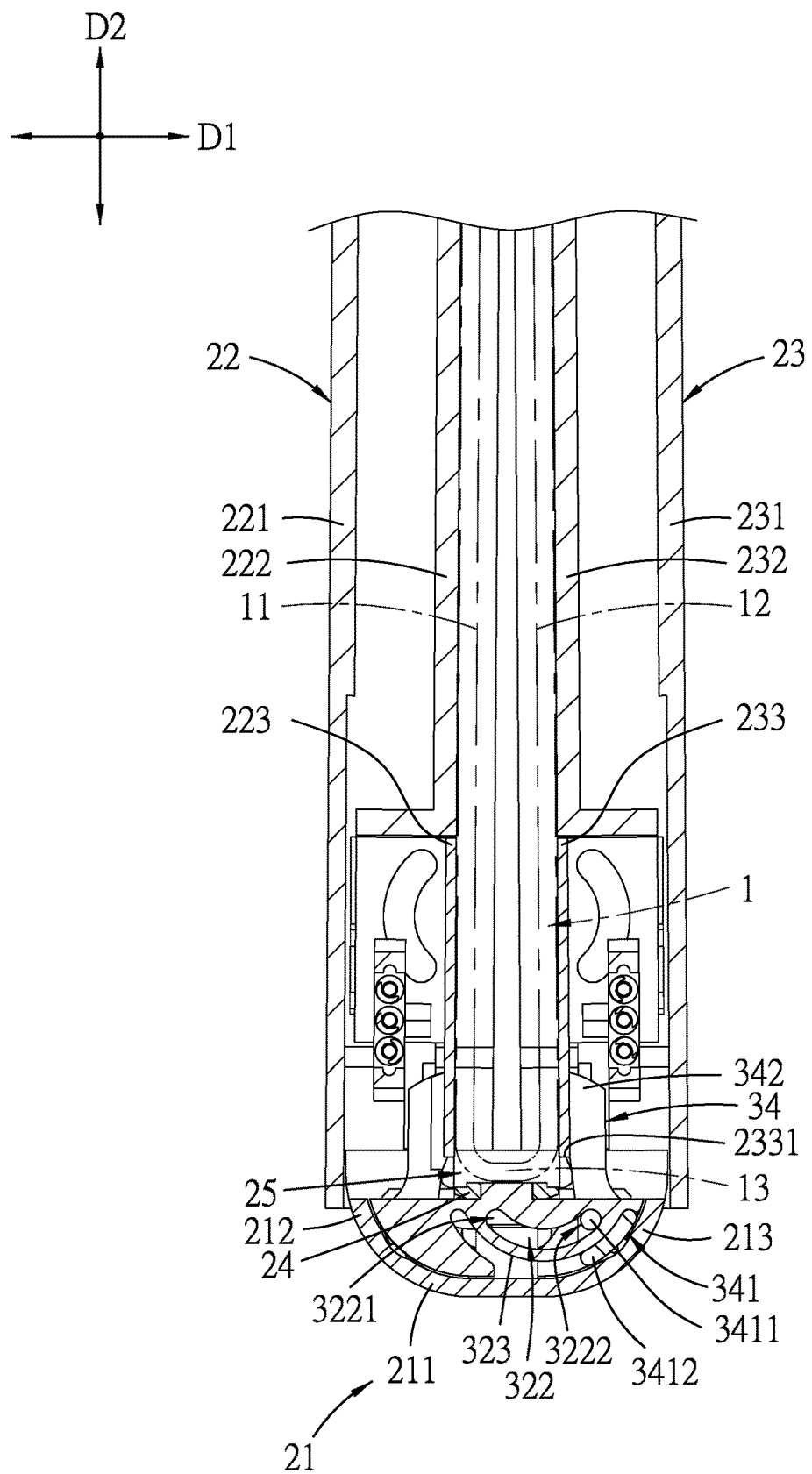
FIG. 18 is a sectional view taken along line XVIII-XVIII of FIG. 13.

Similarly, referring to FIGS. 4 to 7, the second movable member 34 is adjoined to the second inner guiding members 32 in the width direction (D3), and has a second moving end portion 341 which is slidably engaged in the second inner sliding slots 322, and a second connecting end portion 342 which is opposite to the second moving end portion 341 in the lengthwise direction (D1) and which is connected with the second inboard end edge 2331 of the second substrate unit 23. Specifically, the second moving end portion 341 of the second movable member 34 has a second sliding pin 3411 which extends in the width direction (D3) and which is slidably engaged in the second inner sliding slots 322, and a second sliding block 3412 which is slidably engaged on the second rail walls 323. In this embodiment, the second movable member 34 is disposed at a side of the second inner guiding members 32 toward the first inner guiding members 31. The second connecting end portion 342 is disposed close to the second arcuate extension wall 213. The second movable member 34 has a top positioning portion 3421 which fittingly extends in the second inner support plate 233 so as to keep the second movable member 34 abutting against the second inner guiding members 32. The second moving end portion 341 is disposed close to the first arcuate extension wall 212. The second sliding pin 3411 is cylindrical to be slidably engaged with slot walls of the second inner sliding slots 322. The second sliding block 3412 is substantially rectangular and slightly arcuate to be slidably engaged on the second rail walls 323. With the engagement of the second sliding pin and block 3411, 3412 with the second sliding slots and rail walls 322, 323, the second movable member 33 is slidable stably and smoothly relative to the second inner guiding members 32 such that the second connecting end portion 342 is movable upwardly to be placed upwardly of the second moving end portion 341 and to bring the second substrate unit 23 and the second face part 12 in an upright state, as shown in FIG. 18. Alternatively, the second sliding block 3412 may be omitted. In the parallel unfolded state, as shown in FIG. 17, the second sliding pin 3411 is placed in the second slot ends 3221.

Figure 7:
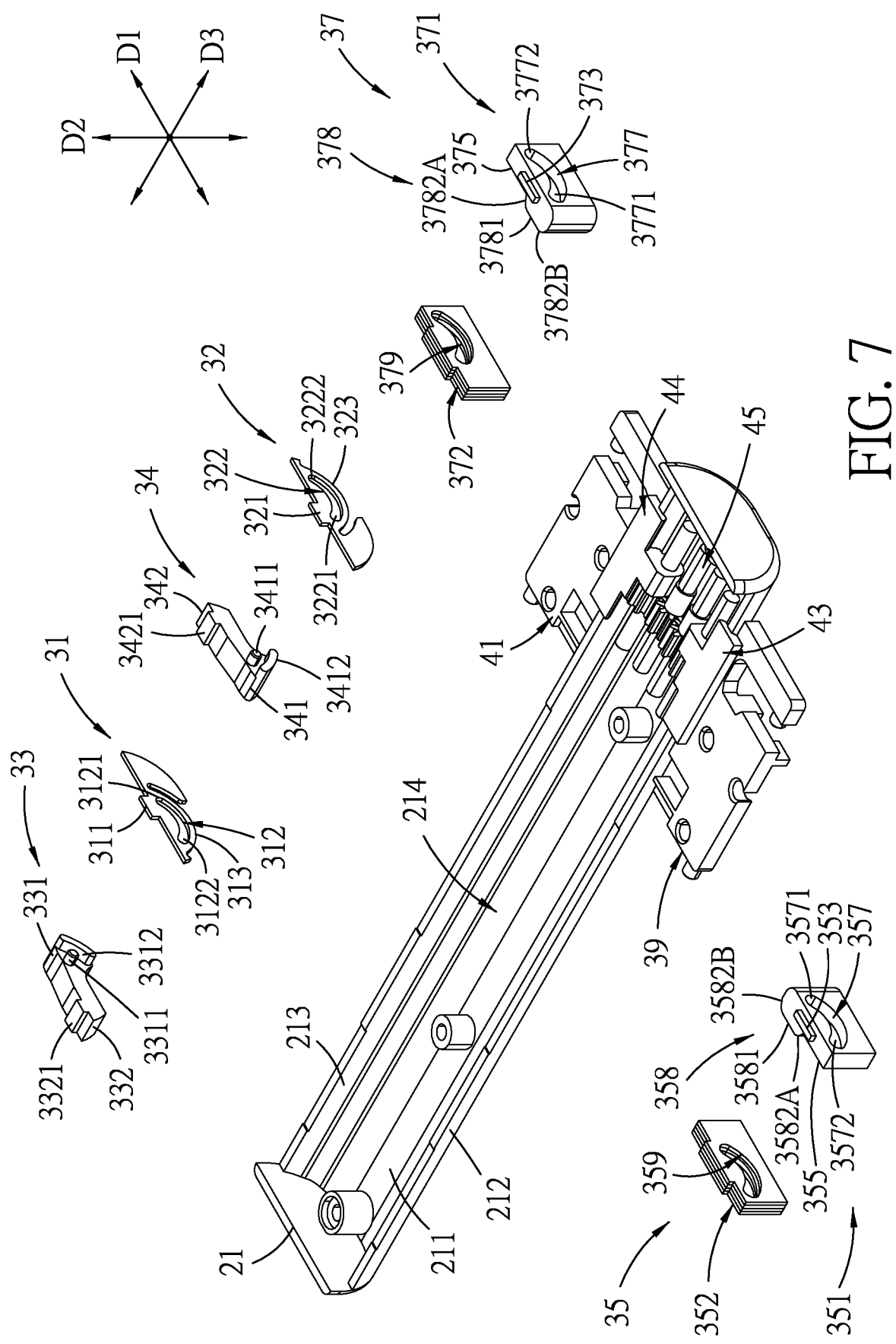
FIG. 7 is an exploded perspective view of a portion of a hinge mechanism of the embodiment.
Figure 8:
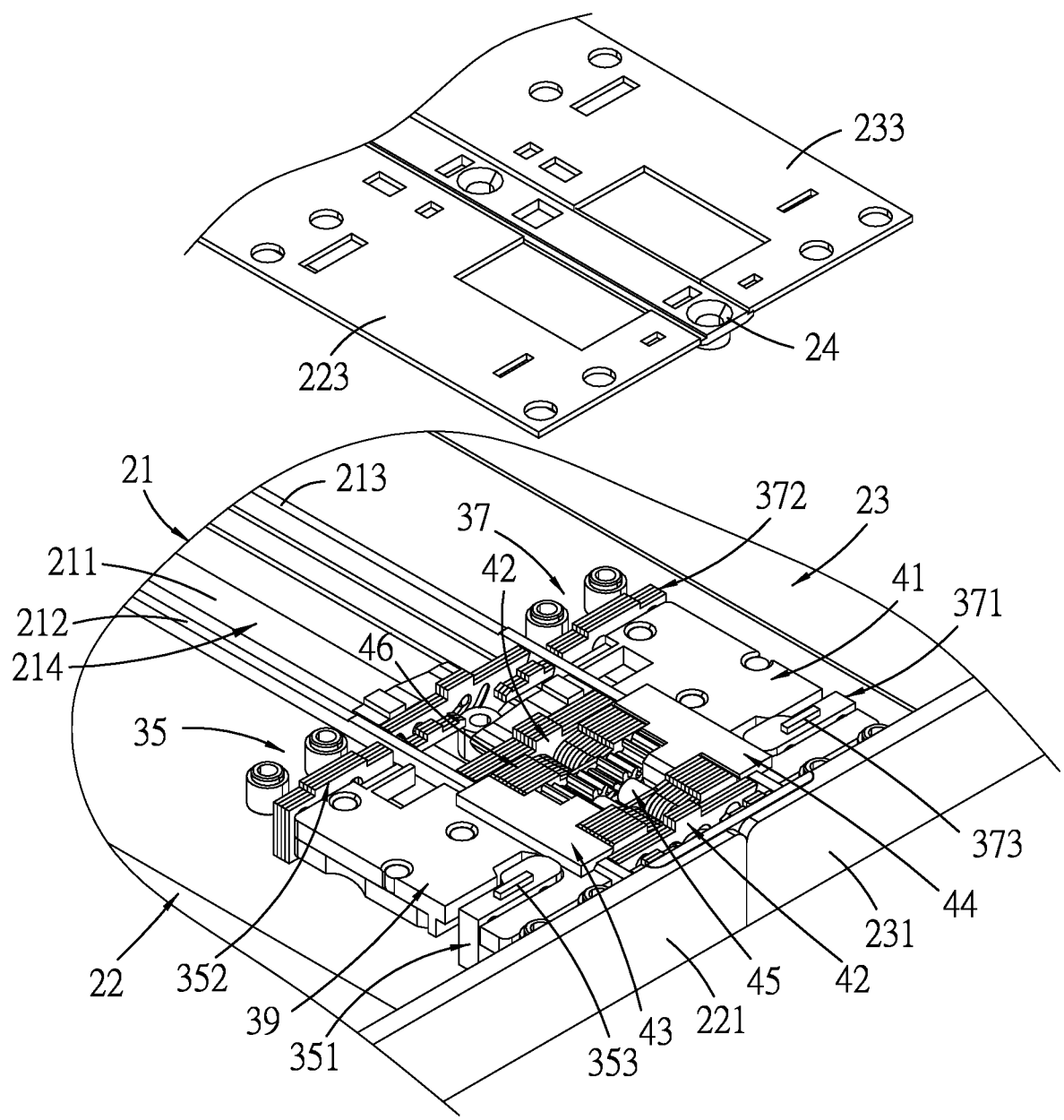
FIG. 8 is an enlarged, exploded perspective view of FIG. 4.

Referring to FIGS. 7 and 8, in this embodiment, the first outer guiding assembly 35 includes a first outer guiding member 351 and a first auxiliary guiding member 352 spaced apart from each other in the width direction (D3), and disposed in the first housing 221 and proximate to the first arcuate extension wall 212. The first outer guiding member 351 is disposed proximate to a side wall of the first housing 221, and is substantially of a cuboid. The first outer guiding member 351 has an upper positioning portion 353 which extends in the first inner support plate 223 so as to be erected in the height direction (D2). The first outer guiding member 351 is formed with a first outer sliding slot 357 which is elongated in the lengthwise direction (D1), and a first projecting portion 358 which projects from a major surface 355 thereof in the width direction (D3) and which is disposed proximate to the first arcuate extension wall 212. The first outer sliding slot 357 is curved downwardly toward a bottom wall of the first housing 221. The first projecting portion 358 has a flat surface section 3581 which faces in the width direction (D3) and extends in the lengthwise direction (D1) to terminate at two slope surface sections (3582A, 3582B). The first outer sliding slot 357 extends to terminate at first outer slot ends 3571, 3572 respectively proximate to and distal from the base seat 21.

The first auxiliary guiding member 352 is similar to the first outer guiding member 351 in structure, but dispenses with the first projecting portion 358. Specifically, the first auxiliary guiding member 352 is formed with a first auxiliary sliding slot 359 which is aligned with the first outer sliding slot 357 in the width direction (D3).

Similarly, referring to FIGS. 7 and 8, in this embodiment, the second outer guiding assembly 37 includes a second outer guiding member 371 and a second auxiliary guiding member 372 spaced apart from each other in the width direction (D3), and disposed in the second housing 231 and proximate to the second arcuate extension wall 213. The second outer guiding member 371 is disposed proximate to a side wall of the second housing 231, and is substantially of a cuboid. The second outer guiding member 371 has an upper positioning portion 373 which extends in the second inner support plate 233 so as to be erected in the height direction (D2). The second outer guiding member 371 is formed with a second outer sliding slot 377 which is elongated in the lengthwise direction (D1), and a second projecting portion 378 which projects from a major surface 375 thereof in the width direction (D3) and which is disposed proximate to the second arcuate extension wall 213. The second outer sliding slot 377 is curved downwardly toward a bottom wall of the second housing 231. The second projecting portion 378 has a flat surface section 3781 which faces in the width direction (D3) and extends in the lengthwise direction (D1) to terminate at two slope surface sections (3782A, 3782B). The second outer sliding slot 377 extends to terminate at second outer slot ends 3771, 3772 respectively proximate to and distal from the base seat 21.

The second auxiliary guiding member 372 is similar to the second outer guiding member 371 in structure, but dispenses with the second projecting portion 378. Specifically, the second auxiliary guiding member 372 is formed with a second auxiliary sliding slot 379 which is aligned with the second outer sliding slot 377 in the width direction (D3).

Figure 9:
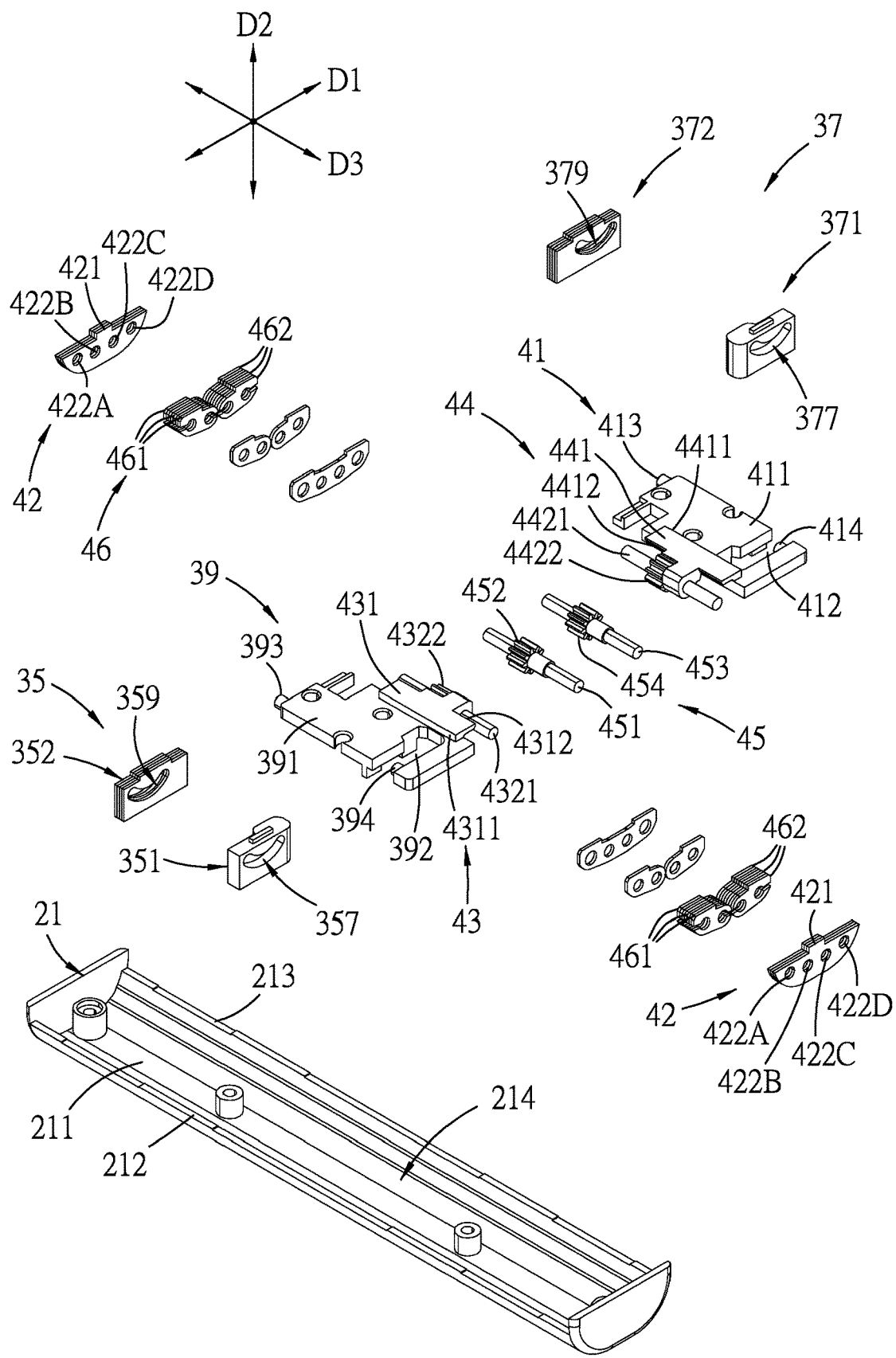
FIG. 9 is an exploded perspective view of a portion of the hinge mechanism of the embodiment.

Referring to FIGS. 7 to 9, the first outer connecting member 39 is disposed on the first substrate unit 22, and includes a connecting body 391 which has a notch 392 for insertion of the first outer guiding member 351 therein, a first outer sliding pin 394 which extends in the notch 392 in the width direction (D3), and a first auxiliary sliding pin 393 which extends in the width direction (D3) and which is aligned with the first outer sliding pin 394. The connecting body 391 is spaced apart from the bottom wall of the first housing 221 (see FIG. 21). The first outer sliding pin 394 and the first auxiliary sliding pin 393 are slidably engaged in the first outer sliding slot 357 and the first auxiliary sliding slot 359, respectively.

Similarly, referring to FIGS. 7 to 9, the second outer connecting member 41 is disposed on the second substrate unit 23, and includes a connecting body 411 which has a notch 412 for insertion of the second outer guiding member 371 therein, a second outer sliding pin 414 which extends in the notch 412 in the width direction (D3), and a second auxiliary sliding pin 413 which extends in the width direction (D3) and which is aligned with the second outer sliding pin 414. The connecting body 411 is spaced apart from the bottom wall of the second housing 231 (see FIG. 21). The second outer sliding pin 414 and the second auxiliary sliding pin 413 are slidably engaged in the second outer sliding slot 377 and the second auxiliary sliding slot 379, respectively.

Referring to FIGS. 8 and 9, the support members 42 are disposed in the base seat 21 and are spaced apart from each other in the width direction (D3). Specifically, the support members 42 are disposed in the accommodation space 214. Each support member 42 has an upper positioning portion 421 which extends in the top support plate 24 to be erectly retained in the accommodation space 214. Each support member 42 has four pivot holes (422A, 422B, 422C, 422D) extending therethrough and spaced apart from one another in the lengthwise direction (D1).

Referring to FIGS. 8 and 9, the first linking unit 43 is disposed to couple the first outer connecting member 39 with the support members 42. In this embodiment, the first linking unit 43 has a linking body 431 which is disposed over the first arcuate extension wall 212 and which has an outer side portion 4311 that is connected with the connecting body 391 of the first outer connecting member 39, and an inner side portion 4312 that is opposite to the outer side portion 4311 and proximate to the second arcuate extension wall 213, a first linking shaft 4321 which extends from the inner side portion 4312 in the width direction (D3) to have two shaft ends that are rotatably connected with the support members 42, respectively, through the pivot holes (422A), and a first linking pinion 4322 which is disposed on the first pivot shaft 4321 between the shaft ends. In this embodiment, the linking body 431 is integrally formed with the first outer connecting member 39. With the first linking unit 43, the first outer connecting member 39 is pivotable relative to the support members 42.

Similarly, referring to FIGS. 8 and 9, the second linking unit 44 is disposed to couple the second outer connecting member 41 with the support members 42. In this embodiment, the second linking unit 44 has a linking body 441 which is disposed over the second arcuate extension wall 213 and which has an outer side portion 4411 that is connected with the connecting body 411 of the second outer connecting member 41, and an inner side portion 4412 that is opposite to the outer side portion 4411 and proximate to the first arcuate extension wall 212, a second linking shaft 4421 which extends from the inner side portion 4412 in the width direction (D3) to have two shaft ends that are rotatably connected with the support members 42, respectively, through the pivot holes (422D), and a second linking pinion 4422 which is disposed on the second pivot shaft 4421 between the shaft ends. In this embodiment, the linking body 441 is integrally formed with the second outer connecting member 41. With the second linking unit 44, the second outer connecting member 41 is pivotable relative to the support members 42.

Referring to FIGS. 8 and 9, the synchronously driving unit 45 is disposed between the support members 42 and coupled with the first and second linking units 43, 44 to transmit the pivoting of the first outer connecting member 39 to the second outer connecting member 41 so as to make synchronous pivoting of the first and second outer connecting members 39, 41 in opposite rotational directions. Specifically, the synchronously driving unit 45 includes cylindrical first and second driving shafts 451, 453 each of which extends in the width direction (D3) to have two shaft ends rotatably connected with the support members 42, respectively, through the pivot holes (422B, 422C), and first and second driving pinions 452, 454 which are respectively disposed on the first and second driving shafts 451, 453 and respectively mesh with the first and second linking pinions 4322, 4422. The first and second driving pinions 452, 454 mesh with each other to make the synchronous pivoting of the first and second outer connecting members 39, 41 so as to make a synchronous rotation of the first and second substrate units 22, 23 in opposite rotational directions. In this embodiment, the first driving pinion 452 is integrally formed with the first driving shaft 451, and may be a spur gear, for example. The second driving shaft and pinion 453, 454 have the same structure as that of the first driving shaft and pinion 451, 452. The first and second linking pinions 4322, 4422 and the first and second driving pinions 452, 454 may have the same number of teeth to ensure the same rotational angle of the first and second substrate units 22, 23, and may be varied in accordance with the dimension and design of the electronic device.

Referring again to FIGS. 8 and 9, the friction increasing unit 46 is disposed between two adjacent ones of the first linking unit 43, the second linking unit 44 and the synchronously driving unit 45 to provide a friction to angularly position the first and second linking units 43, 44. The friction increasing unit 46 includes at least one first friction increasing member 461 erected in the height direction (D2) and having two ends which are frictionally and rotatably connected to the first linking and driving shafts 4321, 451, respectively, so as to provide a friction to angularly position the first linking unit 43, and at least one second friction increasing member 462 erected in the height direction (D2) and having two ends which are frictionally and rotatably connected to the second linking and driving shafts 4421, 453, respectively, so as to provide a friction to angularly position the second linking unit 44. In this embodiment, the friction increasing unit 46 includes fourteen of the first friction increasing members 461 and fourteen of the second friction increasing members 462. Seven of the first friction increasing members 461 are adjoined to one another and are disposed between the support members 42 adjacent to the first inner guiding members 32 (see FIG. 4) and the first linking and driving pinions 4322, 452. The other seven of the first friction increasing members 461 are adjoined to one another and are disposed between the support members 42 adjacent to an end wall of the base seat 21 and the first linking and driving pinions 4322, 452. Each of the first friction increasing members 461 is in the form of a metal plate which has two through holes and two splits respectively communicating the through holes such that the first linking and driving shafts 4321, 451 extend through the through holes via the splits and are retained with the metal plate. The second friction increasing members 462 are aligned with the first friction increasing members 461, respectively, in the lengthwise direction (D1). The included angle of the first and second substrate units 22, 23 can range from 0 to 180 degrees.

Figure 10:
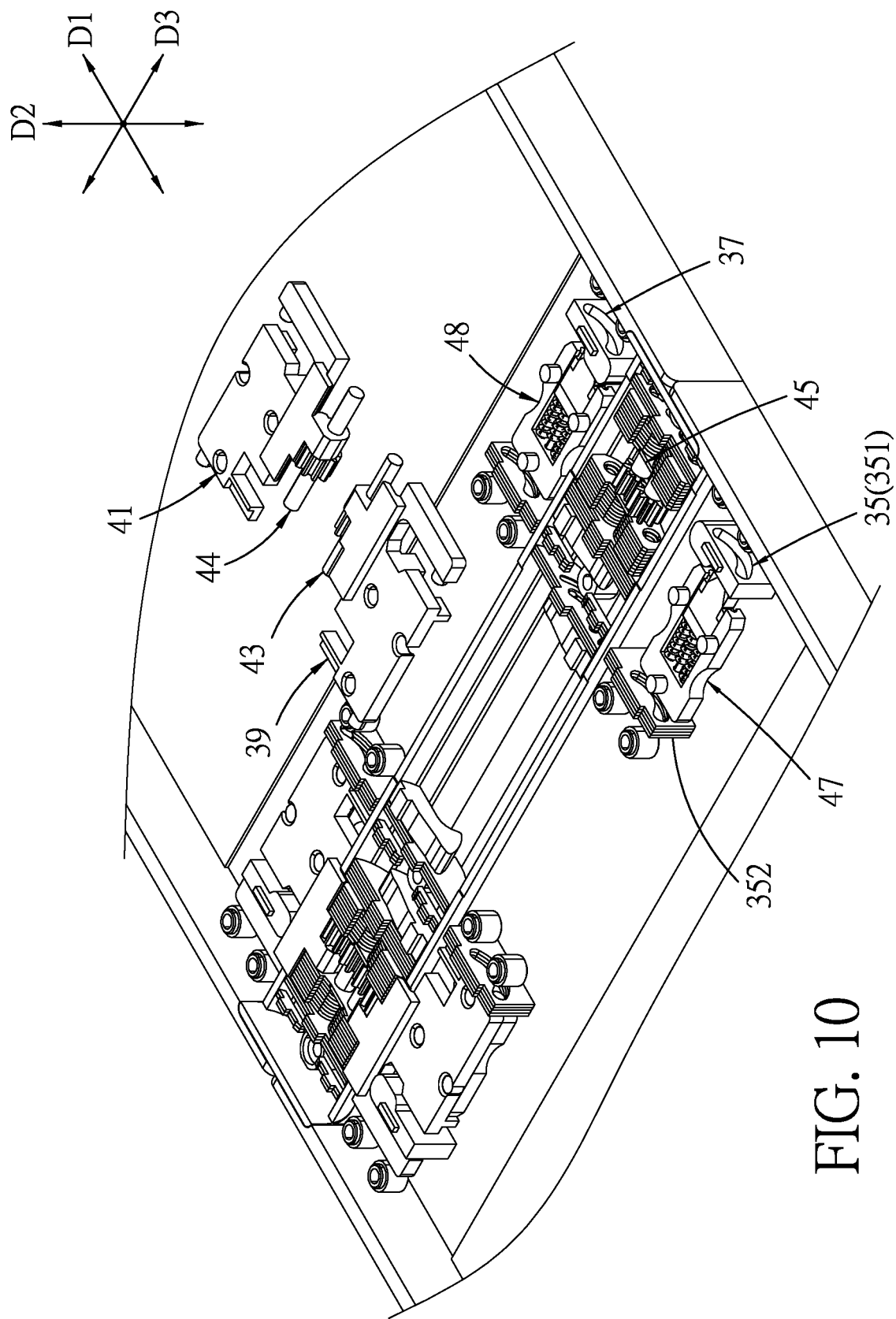
FIG. 10 is a fragmentary exploded perspective view of a portion of the hinge mechanism of the embodiment.
Figure 11:
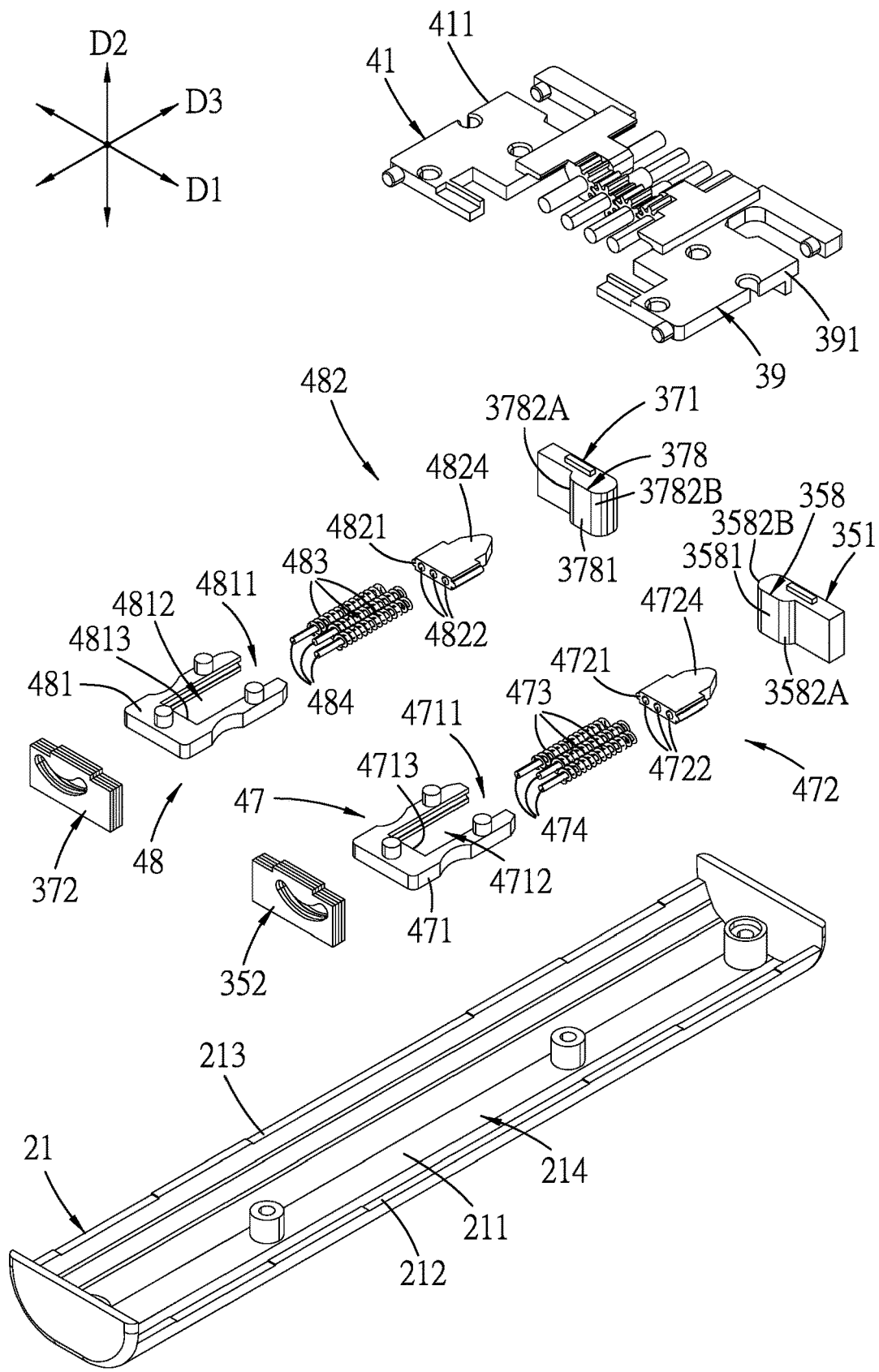
FIG. 11 is an exploded perspective view of a portion of the hinge mechanism of the embodiment.

Referring to FIGS. 10 and 11, the first movement stabilizing unit 47 includes a U-shaped first frame 471, a first stabilizing member 472, a first biasing assembly 473 and a plurality of spring mounting shafts 474. The first frame 471 is securely disposed on a bottom surface of the first outer connecting member 391 and between the first outer guiding member 351 and the first auxiliary guiding member 352, and has a notched space 4712 having an opening 4711 toward the first projecting portion 358 and extending in the width direction (D3) to terminate at an abutted wall 4713. The first stabilizing member 472 is disposed in and slidable relative to the notched space 4712 of the first frame 471 in the width direction (D3), and has a retained end 4724 abutting against the first projecting portion 358, an abutted end 4721 facing the abutted wall 4713, and a plurality of mounting holes 4722 extending from the abutted end 4721 in the width direction (D3). In this embodiment, three of the mounting holes 4722 are formed in the first stabilizing member 472. Three of the spring mounting shafts 474 abut against the abutted wall 4713 at an end, and are respectively received in the mounting holes 4722 at the other end. The first biasing assembly 473 includes three coil springs 473 which are respectively sleeved on the spring mounting shafts 474 and each of which abuts against the abutted wall 4713 and a hole wall of the respective mounting hole 4722 to bias the retained end 4724 of the first stabilizing member 472 to the first projecting portion 358. The number of the coil springs 473 can be varied, such as one, two or more than four.

Similarly, referring to FIGS. 10 and 11, the second movement stabilizing unit 48 includes a U-shaped second frame 481, a second stabilizing member 482, a second biasing assembly 483 and a plurality of spring mounting shafts 484. The second frame 481 is securely disposed on a bottom surface of the second outer connecting member 411 and between the second outer guiding member 371 and the second auxiliary guiding member 372, and has a notched space 4812 having an opening 4811 toward the second projecting portion 378 and extending in the width direction (D3) to terminate at an abutted wall 4813. The second stabilizing member 482 is disposed in and slidable relative to the notched space 4812 of the second frame 481 in the width direction (D3), and has a retained end 4824 abutting against the second projecting portion 378, an abutted end 4821 facing the abutted wall 4813, and a plurality of mounting holes 4822 extending from the abutted end 4821 in the width direction (D3). In this embodiment, three of the mounting holes 4822 are formed in the second stabilizing member 482. Three of the spring mounting shafts 484 abut against the abutted wall 4813 at an end, and are respectively received in the mounting holes 4822 at the other end. The second biasing assembly 483 includes three coil springs 483 which are respectively sleeved on the spring mounting shafts 484 and each of which abuts against the abutted wall 4813 and a hole wall of the respective mounting hole 4822 to bias the retained end 4824 of the second stabilizing member 482 to the second projecting portion 378. The number of the coil springs 483 can be varied, such as one, two or more than four.

Figure 12:
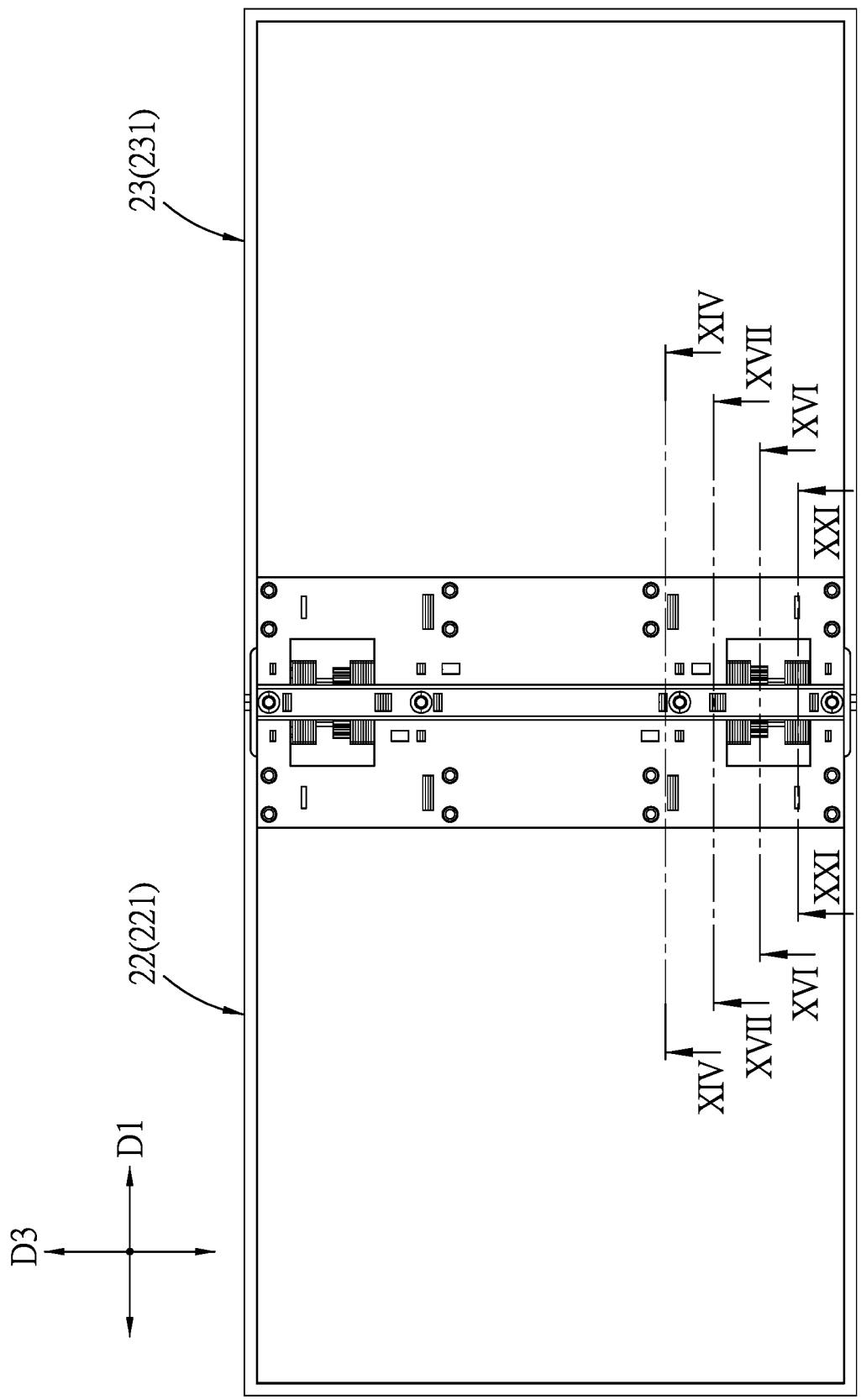
FIGS. 12 and 13 are schematic top views of the embodiment.
Figure 13:
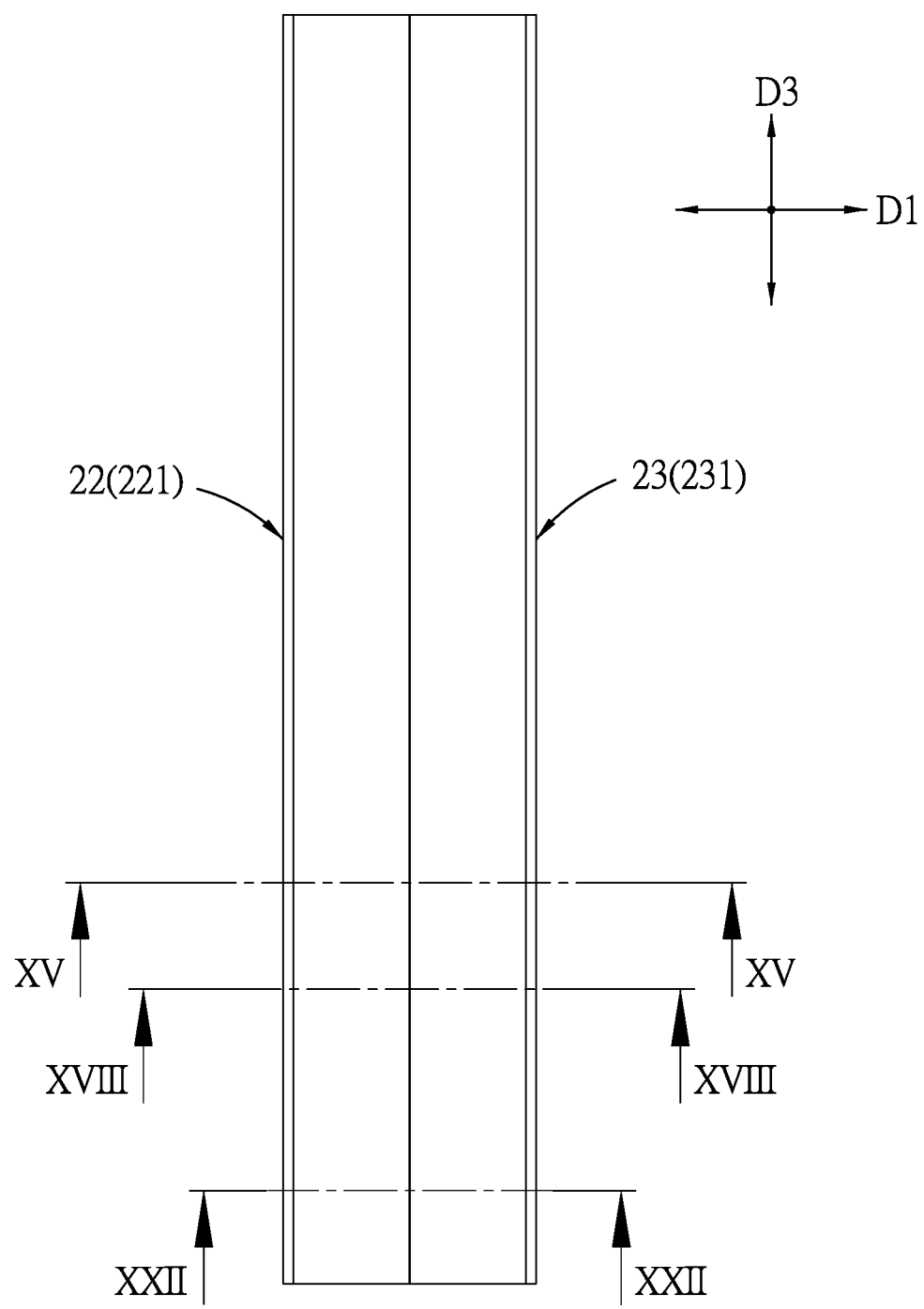

Referring to FIGS. 12 and 13, which respectively illustrate from a top the flexible electronic device in the parallel unfolded state and the upright folded state.

For example, when the first housing 221 is operated by a user to move (rotate) upwardly toward the second housing 231, the first outer and inner support plates 222, 223 are moved upwardly toward the second outer and inner support plates 232, 233, and the first connecting end portion 332 of the first movable member 33 connected with the first inner support plate 223 is rotated upwardly, as shown in FIGS. 14 and 15. That is, the first face part 11 of the flexible display 1 is moved toward the second face part 12. During this upward rotation, the first moving end portion 331 of the first movable member 33 is slid along the first inner sliding slot 312 away from the second substrate unit 23 so as to move the first sliding pin 3311 from the first slot end 3121 to the first slot end 3122 and move the first sliding block 3312 close to the first arcuate extension wall 212. Thus, the first moving end portion 331 is moved closer to the first arcuate extension wall 212. During the sliding movement of the first moving end portion 331, the first connecting end portion 332 is moved upwardly to be placed upwardly of the first moving end portion 331 and projects from the base seat 21, and the first inboard end edge 2231 of the first inner support plate 223 is moved away from the second substrate unit 23. The first outer and inner support plates 222, 223 are in an upright state and are placed between the top support plate 24 and the first arcuate extension wall 212.

Figure 16:
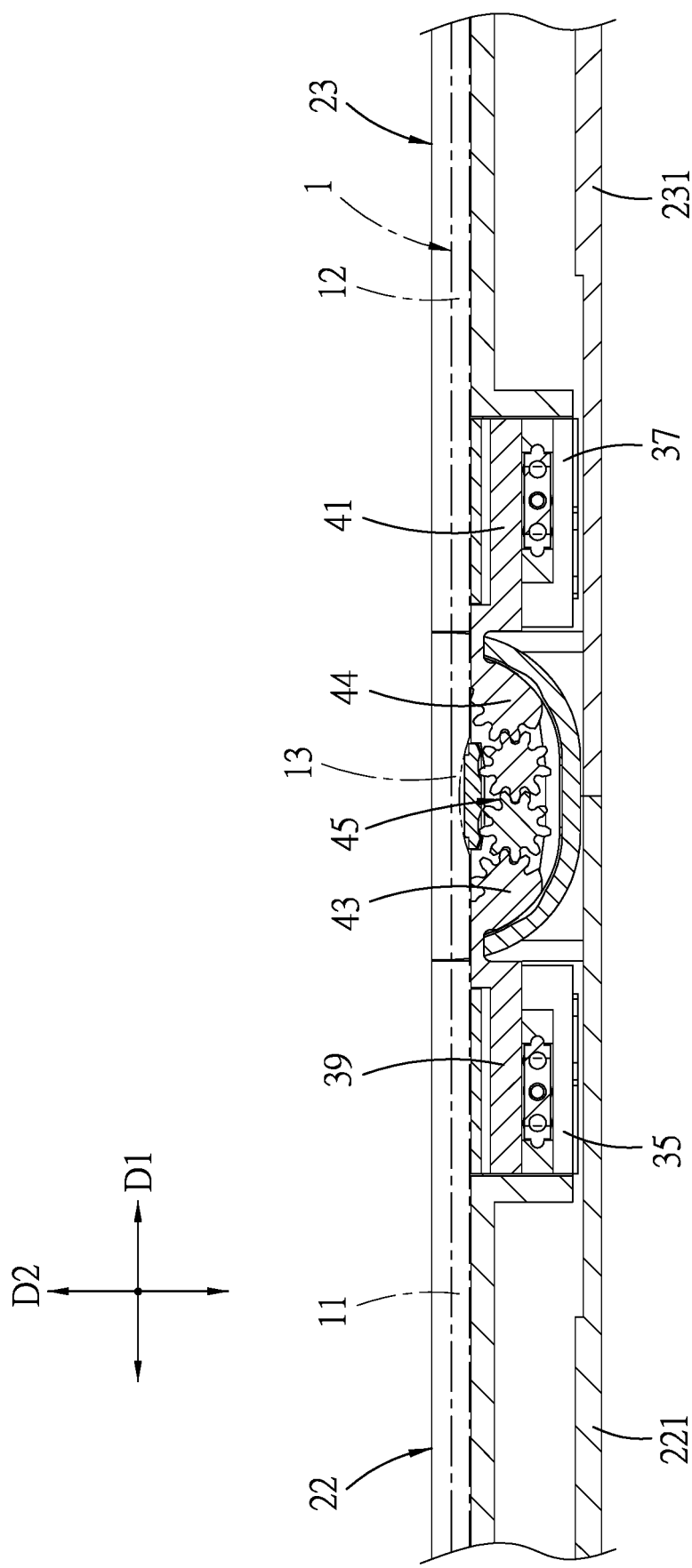
FIG. 16 is a sectional view taken along line XVI-XVI of FIG. 12.

Also, referring to FIG. 16, when the first substrate unit 22 is operated to move upwardly, the first outer guiding assembly 35 is moved with the first housing 221 away from the base seat 21, and the first outer connecting member 39 and the linking body 431 of the first linking unit 43 are pivoted relative to the support members 42. Through the synchronously driving unit 45, the linking body 441 of the second linking unit 44 and the second outer connecting member 41 are pivoted synchronously and in an opposite rotational direction to move the second outer guiding assembly 37 and the second substrate unit 23 upwardly toward the first substrate unit 22.

Figure 19:
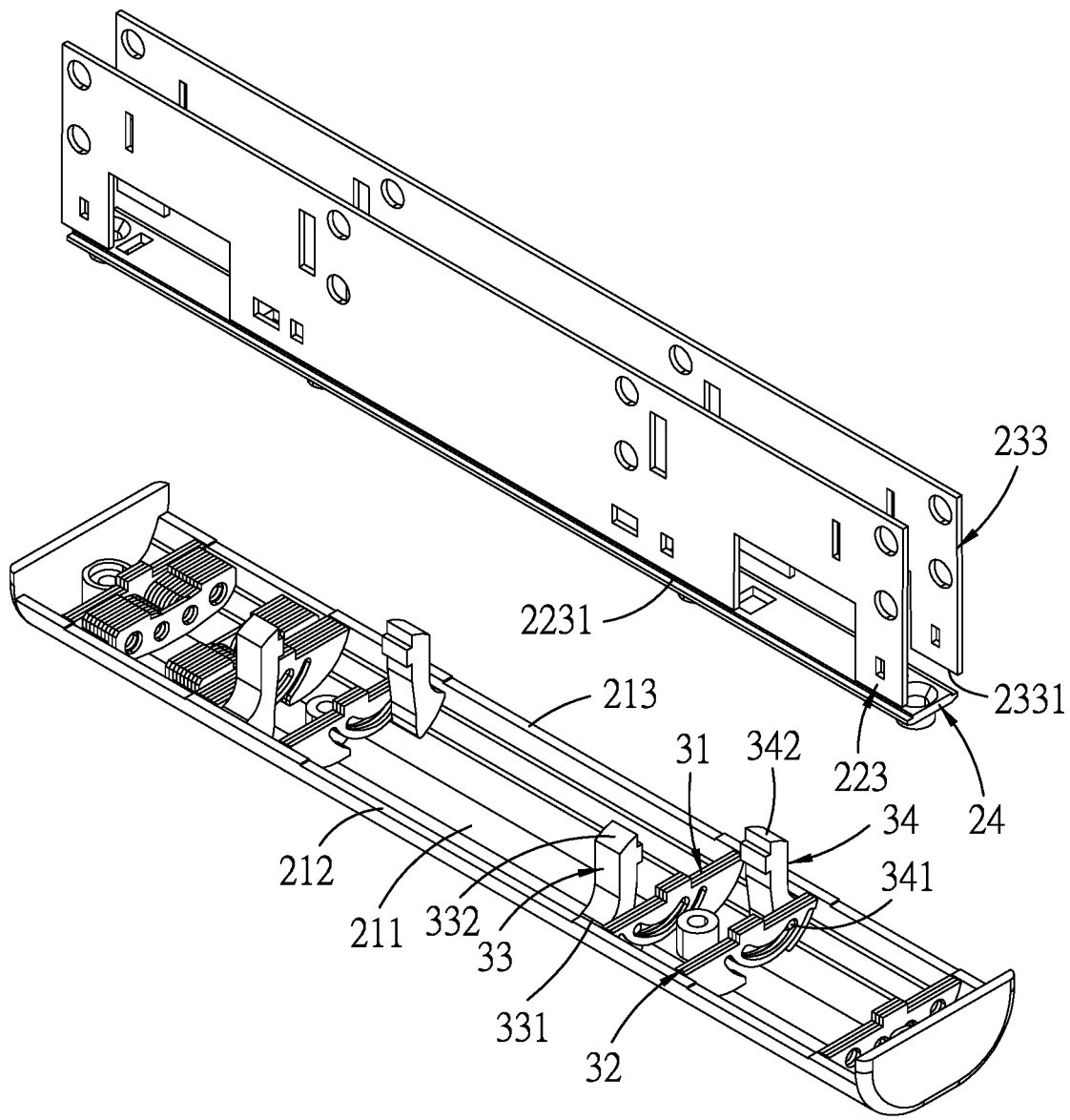
FIG. 19 is an exploded perspective view of a portion of the embodiment.
Figure 20:
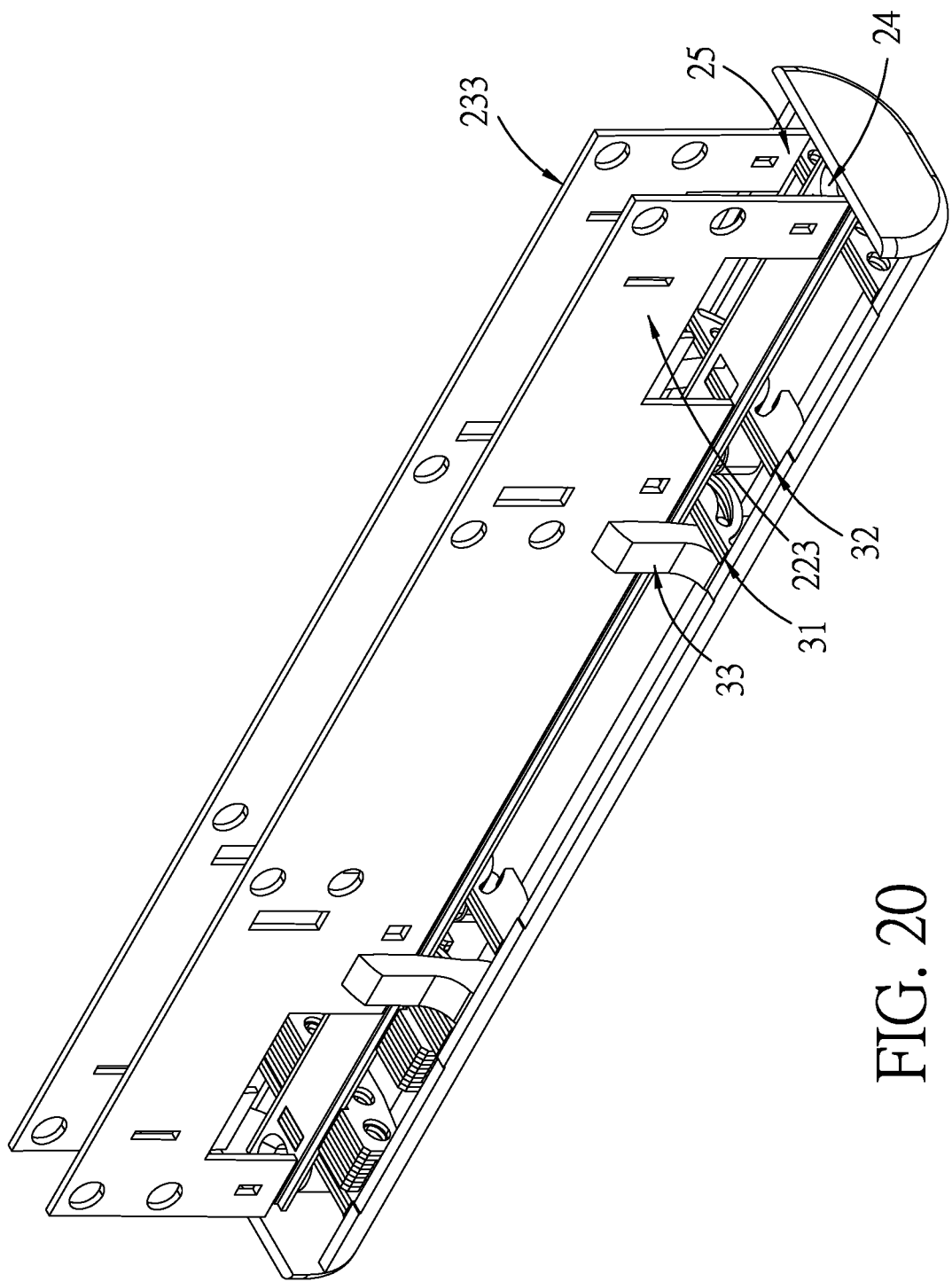
FIG. 20 is a perspective view of FIG. 19.

Referring to FIGS. 17 and 18, when the second housing 231 is moved (rotated) upwardly, the second outer and inner support plates 232, 233 are moved upwardly, and the second connecting end portion 342 of the second movable member 34 connected with the second inner support plate 233 is rotated upwardly. That is, the second face part 12 of the flexible display 1 is moved toward the first face part 11. During this upward rotation, the second moving end portion 341 of the second movable member 34 is slid along the second inner sliding slot 322 away from the first substrate unit 22 so as to move the second sliding pin 3411 from the second slot end 3221 to the second slot end 3222 and move the second sliding block 3412 close to the second arcuate extension wall 213. Thus, the second moving end portion 341 is moved closer to the second arcuate extension wall 213. During the sliding movement of the second moving end portion 341, the second connecting end portion 342 is moved upwardly to be placed upwardly of the second moving end portion 341 and projects from the base seat 21, and the second inboard end edge 2331 of the second inner support plate 233 is moved away from the first substrate unit 22. The second outer and inner support plates 232, 233 are in an upright state and are placed between the top support plate 24 and the second arcuate extension wall 213 so as to provide a leeway space 25 between the first and second inboard end edges 2231, 2331 for a bending part 13 of the flexible display 1 to be bendably received therein, as shown in FIGS. 19 and 20.

Figure 21:
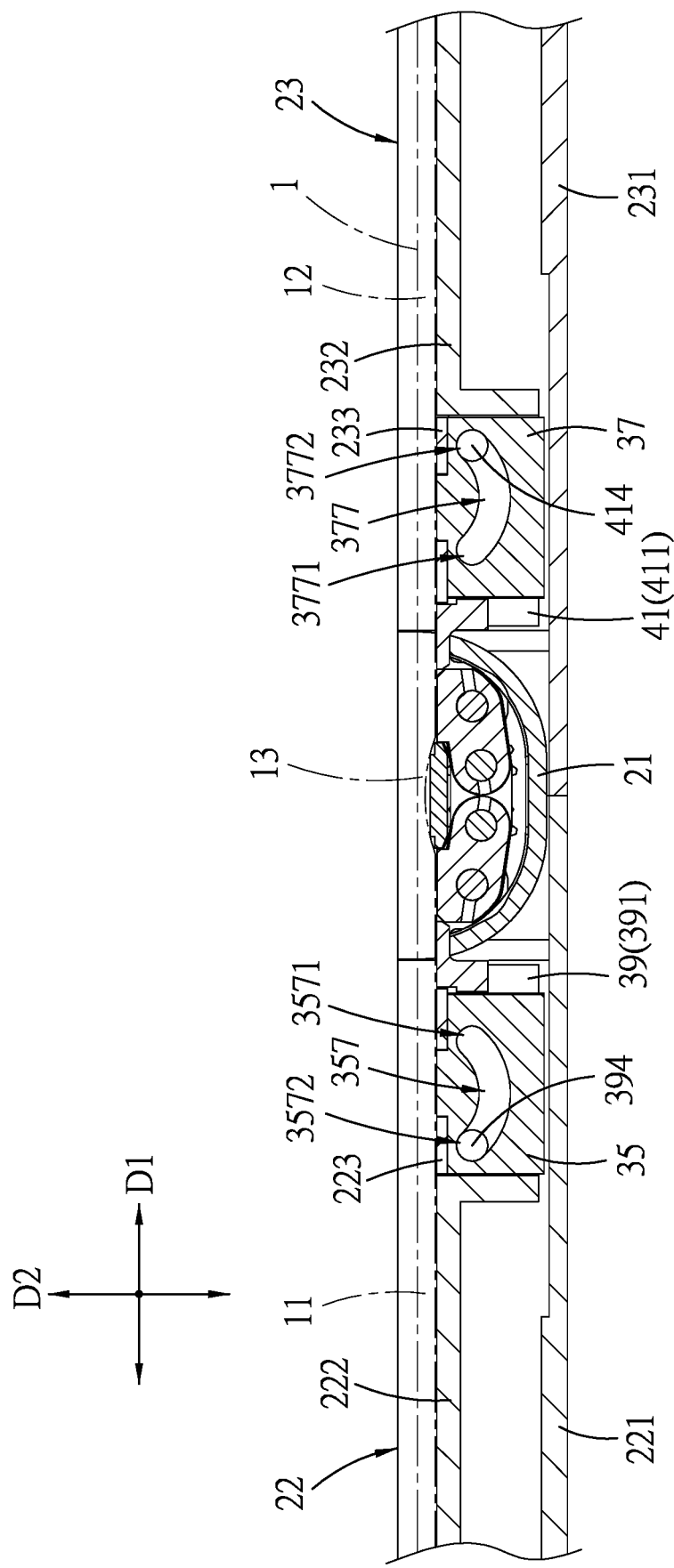
FIG. 21 is a sectional view taken along line XXI-XXI of FIG. 12.
Figure 22:
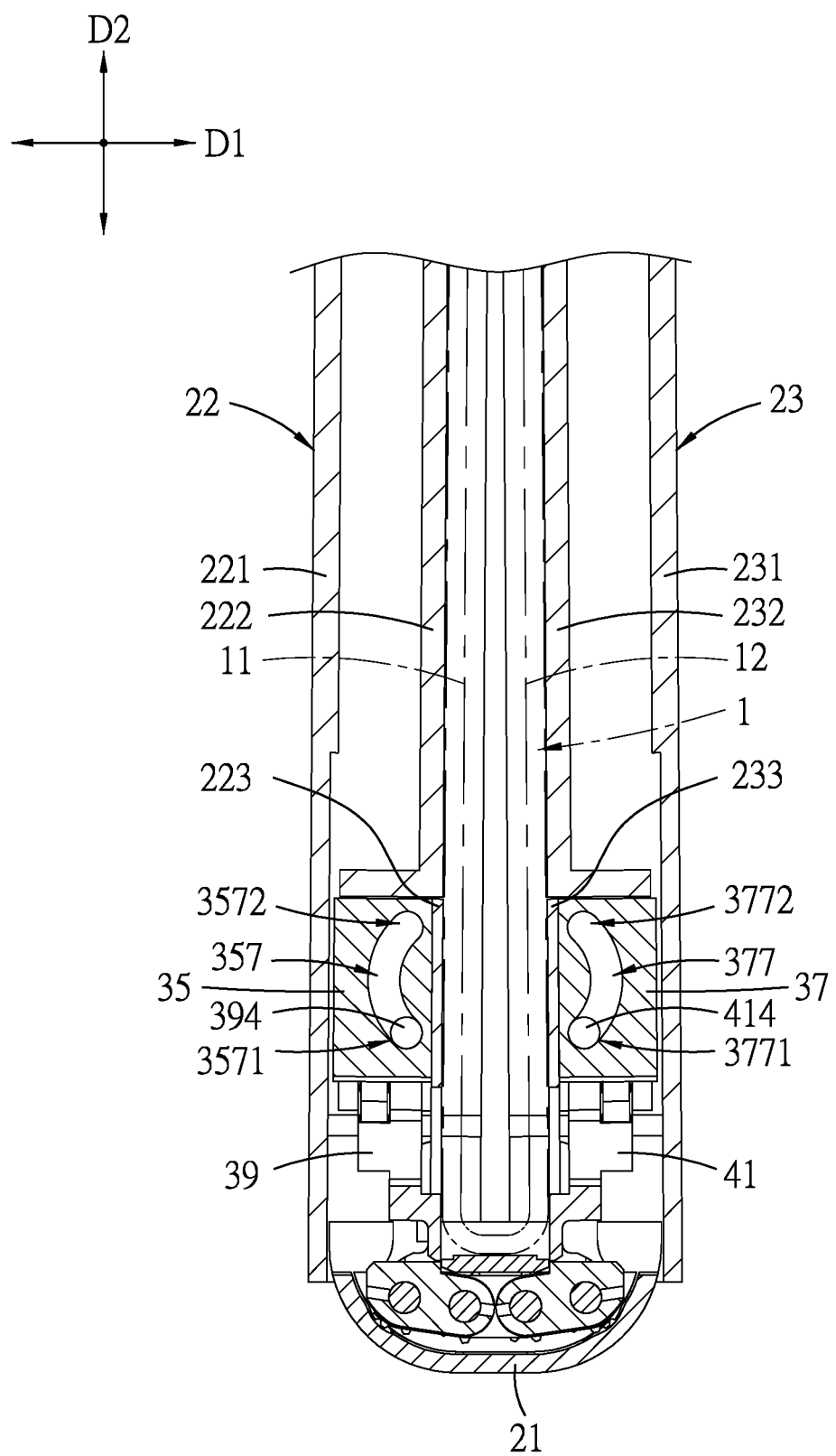
FIG. 22 is a sectional view taken along line XXII-XXII of FIG. 13.

Moreover, referring to FIGS. 21 and 22, during the upward movement (rotation) of the first substrate unit 22, the first outer guiding assembly 35 is moved with the first inner support plate 223 away from the base seat 21 relative to the first outer connecting member 39. That is, the first outer sliding pin 394 is moved relative to the first outer guiding member 351 from the first outer slot end 3572 of the first outer sliding slot 357 to the first outer slot end 3571 of the first outer sliding slot 357, and the first auxiliary sliding pin 393 (see FIG. 9) is synchronously moved relative to the first auxiliary guiding member 352 along the first auxiliary sliding slot 359. On the other hand, during the upward movement (rotation) of the second substrate unit 23, the second outer guiding assembly 37 is moved with the second inner support plate 233 away from the base seat 21 relative to the second outer connecting member 41. That is, the second outer sliding pin 414 is moved relative to the second outer guiding member 371 from the second outer slot end 3772 of the second outer sliding slot 377 to the second outer slot end 3771 of the second outer sliding slot 377, and the second auxiliary sliding pin 413 (see FIG. 9) is synchronously moved relative to the second auxiliary guiding member 372 along the second auxiliary sliding slot 379. Thus, with the movement of the first and second substrate units 22, 23 away from the base seat 21, the first and second face parts 11, 12 of the flexible display 1 are moved and tensed to prevent overbending of the bending part 13.

Figure 23:
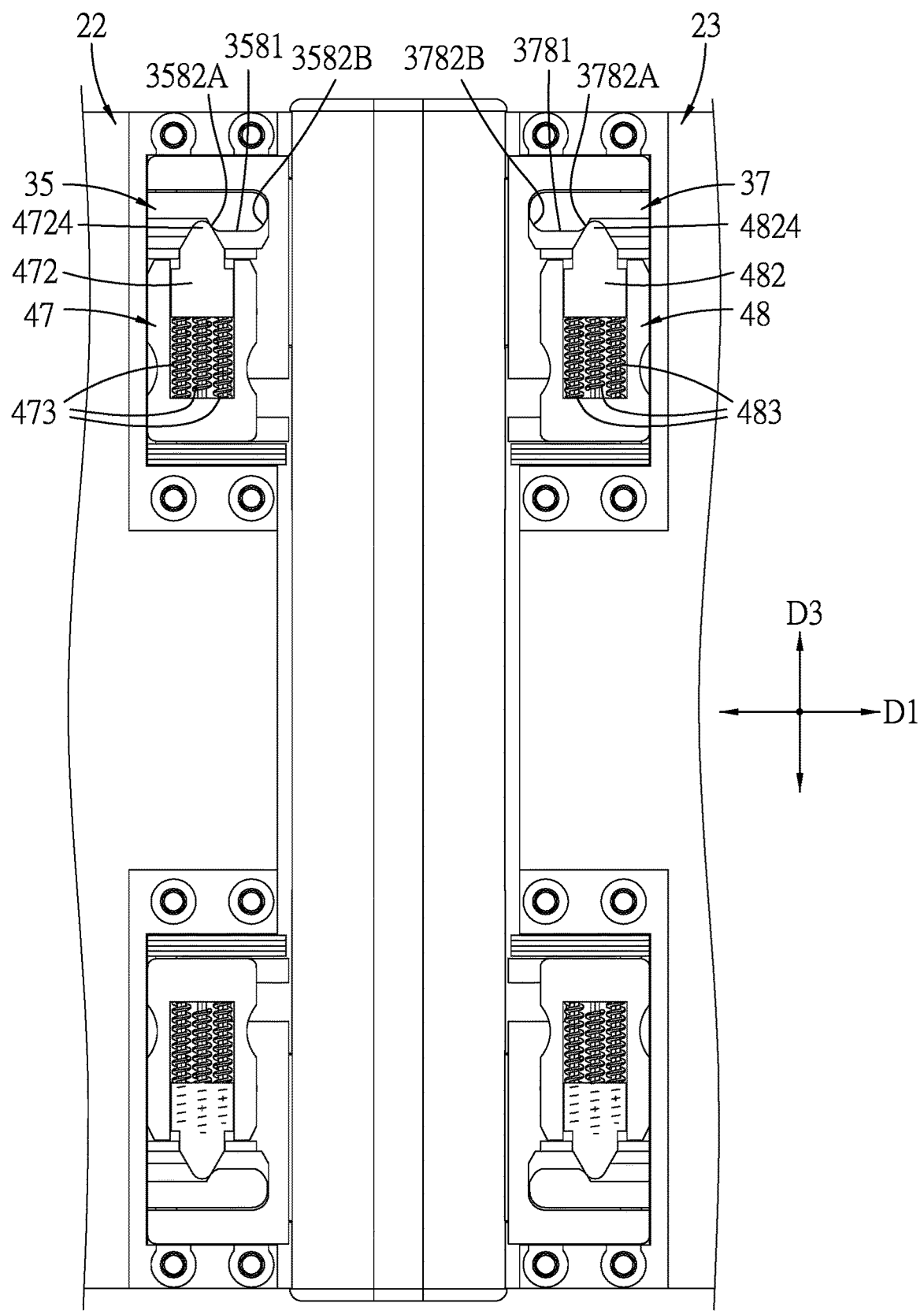
FIG. 23 is a fragmentary bottom view of a portion of the embodiment.
Figure 24:
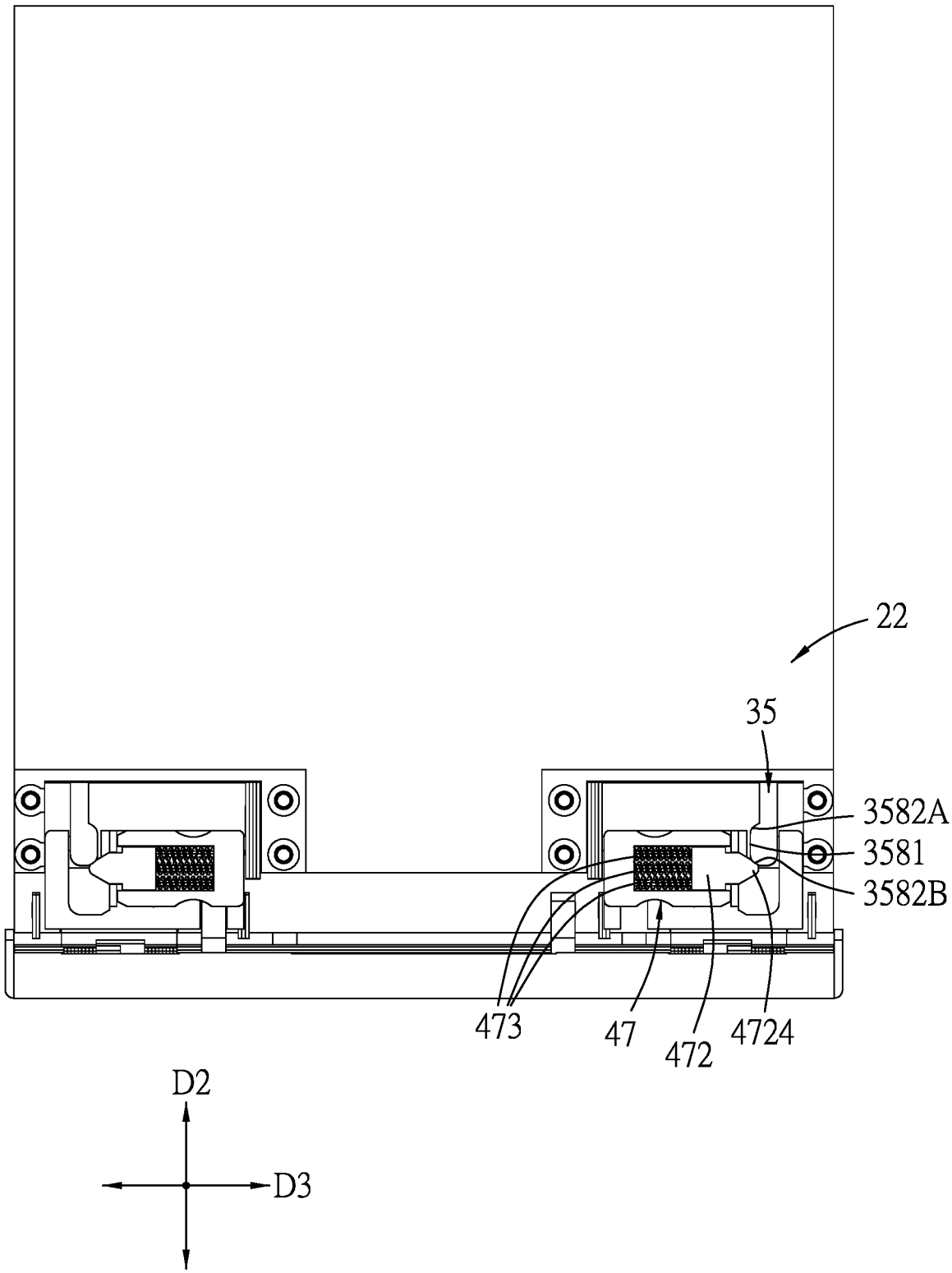
FIGS. 24 and 25 are schematic side views of the embodiment.
Figure 25:
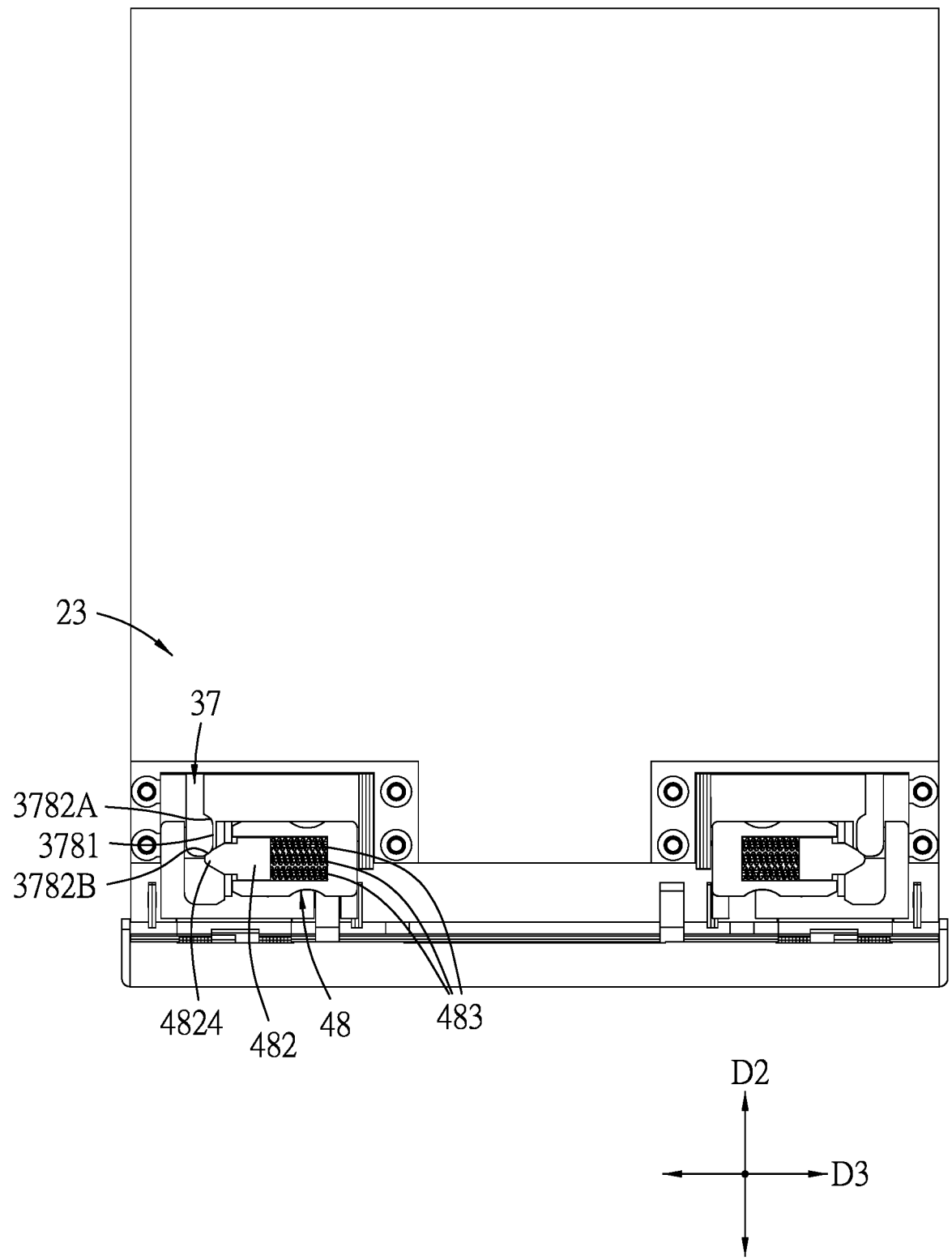

Referring to FIGS. 23 to 25, in the parallel unfolded state, the first stabilizing member 472 is biased by the first biasing assembly 473 to have the retained end 4724 abutting against the slope surface section (3582A). When the first substrate unit 22 is shifted to the upright folded state to move the first outer guiding member 351 away from the base seat 21, the retained end 4724 is moved from the slope surface section (3582A) to the other slope surface section (3582B) through the flat surface section 3581 against the biasing action of the first biasing assembly 473. The operation of the second movement stabilizing unit 48 is the same as that of the first movement stabilizing unit 47, and a detailed description thereof is dispensed therewith.

The number of the first and second inner guiding members 31, 32 can be varied as required to maintain stable and smooth sliding movement of the first and second movable members 33, 34.

As illustrated, the hinge mechanism 3 of the disclosure is mounted on the support mechanism 2. With the movement of the first movable member 33 upwardly and away from the second substrate unit 23, and with the movement of the second movable member 34 upwardly and away from the first substrate unit 22, the first and second inboard end edges 2231, 2331 of the first and second substrate units 22, 23 are moved away from each other so as to provide a bending space 25 therebetween for the flexible display 1 to be bendably received therein.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge mechanism mountable on a support mechanism for carrying a flexible display, the support mechanism including a base seat, and first and second substrate units which respectively have first and second inboard end edges that are respectively disposed at two sides of the base seat opposite in a lengthwise direction and first and second attaching surfaces that extend respectively from the first and second inboard end edges in the lengthwise direction for first and second face parts of the flexible display to be attached thereto, said hinge mechanism comprising:

at least one first inner guiding member disposed in the base seat and erected in a height direction that is transverse to the lengthwise direction, said first inner guiding member having a first inner sliding slot which is elongated in the lengthwise direction;

a first movable member adjoined to said first inner guiding member in a width direction that is transverse to the lengthwise direction, and having a first moving end portion which is slidably engaged in said first inner sliding slot, and a first connecting end portion which is opposite to said first moving end portion in the lengthwise direction and which is connected with the first inboard end edge of the first substrate unit such that said first connecting end portion is movable upwardly to be placed upwardly of said first moving end portion and to bring the first substrate unit and the first face part in an upright state;

at least one second inner guiding member disposed in the base seat, said second inner guiding member having a second inner sliding slot which is elongated in the lengthwise direction; and a second movable member adjoined to said second inner guiding member in the width direction, and having a second moving end portion which is slidably engaged in said second inner sliding slot, and a second connecting end portion which is opposite to said second moving end portion in the lengthwise direction and which is connected with the second inboard end edge of the second substrate unit such that said second connecting end portion is movable upwardly to be placed upwardly of said second moving end portion and to bring the second substrate unit and the second face part in an upright state, wherein during the upward movement of said first connecting end portion, said first moving end portion is slided along said first inner sliding slot away from the second substrate unit, and the first inboard end edge is moved away from the second substrate unit, and during the upward movement of said second connecting end portion, said second moving end portion is slided along said second inner sliding slot away from the first substrate unit, and the second inboard end edge is moved away from the first substrate unit so as to provide a leeway space between the first and second inboard end edges for the flexible display to be bendably received therein.

2. The hinge mechanism as claimed in claim 1, wherein said first inner sliding slot is curved downwardly toward the base seat and is formed proximate to the first substrate unit, said second inner sliding slot being curved downwardly toward the base seat and being formed proximate to the second substrate unit.

3. The hinge mechanism as claimed in claim 1, wherein said first inner guiding member has a first rail wall which borders a bottom thereof and which extends parallel to said first inner sliding slot, said first moving end portion of said first movable member having a first sliding pin which extends in the width direction and which is slidably engaged in said first inner sliding slot, and a first sliding block which is slidably engaged on said first rail wall, said second inner guiding member having a second rail wall which borders a bottom thereof and which extends parallel to said second inner sliding slot, said second moving end portion of said second movable member having a second sliding pin which extends in the width direction and which is slidably engaged in said second inner sliding slot, and a second sliding block which is slidably engaged on said second rail wall.

4. The hinge mechanism as claimed in claim 1, wherein said hinge mechanism comprises a plurality of said first inner guiding members and a plurality of said second inner guiding members, said first inner guiding members respectively having major walls attached and adjoined to each other in the width direction to have said first inner sliding slots thereof aligned with each other such that said first moving end portion of said first movable member is slidably engaged in said first inner sliding slots, said second inner guiding members respectively having major walls attached and adjoined to each other in the width direction to have said second inner sliding slots thereof aligned with each other such that said second moving end portion of said second movable member is slidably engaged in said second inner sliding slots.

5. The hinge mechanism as claimed in claim 1, further comprising:
two support members disposed in the base seat and spaced apart from each other in the width direction;
a first outer guiding assembly including a first outer guiding member which is disposed on the first substrate unit and which is erected in the height direction, said first outer guiding member having a first outer sliding slot which is elongated in the lengthwise direction;
a first outer connecting member adjoined to said first outer guiding member in the width direction and having a first outer sliding pin that is slidably engaged in said first outer sliding slot;
a first linking unit coupling said first outer connecting member with said support members to permit pivoting of said first outer connecting member relative to said support members;
a second outer guiding assembly including a second outer guiding member which is disposed on the second substrate unit and which is erected in the height direction, said second outer guiding member having a second outer sliding slot which is elongated in the lengthwise direction;
a second outer connecting member adjoined to said second outer guiding member in the width direction and having a second outer sliding pin that is slidably engaged in said second outer sliding slot;
a second linking unit coupling said second outer connecting member with said support members to permit pivoting of said second outer connecting member relative to said first support members, wherein during the upward movement of said first connecting end portion of said first movable member, said first outer guiding member is moved with the movement of the first substrate unit away from the base seat and relative to said first outer sliding pin, and during the upward movement of said second connecting end portion of said second movable member, said second outer guiding member is moved with the movement of the second substrate unit away from the base seat and relative to said second outer sliding pin.

6. The hinge mechanism as claimed in claim 5, further comprising a synchronously driving unit which is disposed between said support members and coupled with said first and second linking units to transmit the pivoting of said first outer connecting member to said second outer connecting member so as to make synchronous pivoting of said first and second outer connecting members in opposite rotational directions.

7. The hinge mechanism as claimed in claim 6, wherein said first linking unit includes a first linking shaft extending in the width direction to have two shaft ends rotatably connected with said support members, respectively, and a first linking pinion disposed on said first pivot shaft between said shaft ends, said second linking unit including a second linking shaft extending in the width direction to have two shaft ends rotatably connected with said support members, respectively, and a second linking pinion disposed on said second pivot shaft between said shaft ends, said synchronously driving unit including first and second driving shafts each of which extends in the width direction to have two shaft ends rotatably connected with said support members, respectively, and first and second driving pinions which are respectively disposed on said first and second driving shafts and respectively mesh with said first and second linking pinions, said first and second driving pinions meshing with each other to make the synchronous pivoting of said first and second outer connecting members.

8. The hinge mechanism as claimed in claim 6, further comprising a friction increasing unit disposed between two adjacent ones of said first linking unit, said second linking unit and said synchronously driving unit to provide a friction to angularly position said first and second linking units.

9. The hinge mechanism as claimed in claim 7, further comprising
at least one first friction increasing member erected in the height direction and having two ends which are frictionally and rotatably connected to said first linking and driving shafts, respectively, so as to provide a friction to angularly position said first linking unit; and
at least one second friction increasing member erected in the height direction and having two ends which are frictionally and rotatably connected to said second linking and driving shafts, respectively, so as to provide a friction to angularly position said second linking unit.

10. The hinge mechanism as claimed in claim 5, wherein said first outer guiding member has a first projecting portion which projects from a major surface thereof in the width direction, said first projecting portion having a flat surface section which faces in the width direction and extends in the lengthwise direction to terminate at two slope surface sections, said hinge mechanism further comprising a first movement stabilizing unit, said first movement stabilizing unit including a first frame which is disposed on said first outer connecting member, a first stabilizing member which is disposed in and slidable relative to said first frame in the width direction and which has a retained end abutting against said first projecting portion, and a first biasing assembly which is disposed to bias said retained end to said first projecting portion such that, when the first substrate unit is shifted to the upright state to move said first outer guiding member away from the base seat, said retained end is moved from one of said slope surface sections to the other one of said slope surface sections through said flat surface section.

\* \* \* \* \*